US009889607B2

United States Patent
Haider et al.

(10) Patent No.: US 9,889,607 B2
(45) Date of Patent: Feb. 13, 2018

(54) THREE-DIMENSIONAL PRINTER WITH INTEGRATED COLORING SYSTEM

(71) Applicant: MakerBot Industries, LLC, Brooklyn, NY (US)

(72) Inventors: Charles John Haider, St. Paul, MN (US); Michael Joseph Kobida, Lake Barrington, IL (US); Cedric James Kovacs-Johnson, Wilmette, IL (US); Taylor Michael Fahey, Belle Plaine, MN (US); Tim Andreas Osswald, Madison, WI (US)

(73) Assignee: MakerBot Industries, LLC, Brooklyn, NY (US)

( * ) Notice: Subject to any disclaimer, the term of this patent is extended or adjusted under 35 U.S.C. 154(b) by 180 days.

(21) Appl. No.: 14/829,023

(22) Filed: Aug. 18, 2015

(65) Prior Publication Data

US 2015/0352789 A1  Dec. 10, 2015

Related U.S. Application Data

(63) Continuation-in-part of application No. 14/589,841, filed on Jan. 5, 2015.
(Continued)

(51) Int. Cl.
*G06F 19/00* (2011.01)
*B29C 67/00* (2017.01)
(Continued)

(52) U.S. Cl.
CPC ........ *B29C 67/0085* (2013.01); *B29C 64/106* (2017.08); *B29C 64/20* (2017.08);
(Continued)

(58) Field of Classification Search
None
See application file for complete search history.

(56) References Cited

U.S. PATENT DOCUMENTS 5,888,651 A * 3/1999 Hoyt ................ D01D 5/253
428/370
5,936,861 A  8/1999 Wang et al.
(Continued)

FOREIGN PATENT DOCUMENTS

WO  WO-2012152511  11/2012
WO  WO-2015126733  8/2015

OTHER PUBLICATIONS

EPO, "EP Application Serial No. 15751830.9, Search Report dated Sep. 21, 2017", 7 pages.
(Continued)

*Primary Examiner* — Philip Wang
(74) *Attorney, Agent, or Firm* — Strategic Patents, P.C.

(57) ABSTRACT

A three-dimensional printer effects color changes in an extrudate using a color-application unit applying a colorant to the interior of a filament before it is melted within an extruder. Specifically, the color-application unit may receive a filament (or portions thereof) having an exposed interior surface, where color applicators are actuated to apply one or more colors to the interior surface of the filament in order to modify the extruded color. The filament may then be coupled, collapsed, or otherwise closed about the interior surface, e.g., by a mechanical coupler, to substantially enclose the interior surface of the filament, which is then fed to the extruder for fabricating a colored object in a three-dimensional fabrication process. By enclosing the colored surface within the filament before melting for extrusion, transition effects of a color change can be mitigated and transition time for a substantially complete change in color can be significantly reduced.

20 Claims, 18 Drawing Sheets

Related U.S. Application Data

(60) Provisional application No. 62/051,944, filed on Sep. 17, 2014, provisional application No. 61/941,899, filed on Feb. 19, 2014.

(51) Int. Cl.
  *B33Y 30/00* (2015.01)
  *B29C 64/106* (2017.01)
  *B29C 64/20* (2017.01)
  *B29C 64/386* (2017.01)
  *B33Y 10/00* (2015.01)
  *B29L 9/00* (2006.01)
  *B33Y 50/02* (2015.01)

(52) U.S. Cl.
  CPC ............ *B29C 64/386* (2017.08); *B33Y 30/00* (2014.12); *B29L 2009/00* (2013.01); *B33Y 10/00* (2014.12); *B33Y 50/02* (2014.12)

(56) References Cited

U.S. PATENT DOCUMENTS

| | | |
|---|---|---|
| 6,280,785 B1 | 8/2001 | Yang et al. |
| 6,730,399 B2 | 5/2004 | Baughman et al. |
| 6,756,120 B2 | 6/2004 | Baughman et al. |
| 6,893,489 B2 | 5/2005 | Lem et al. |
| 6,982,117 B2 | 1/2006 | Baughman et al. |
| 7,991,498 B2 | 8/2011 | Kritchman et al. |
| 8,439,665 B2 | 5/2013 | Batchelder et al. |
| 8,920,697 B2 | 12/2014 | Deckard et al. |
| 2003/0044593 A1 | 3/2003 | Vaidyanathan et al. |
| 2007/0228590 A1 | 10/2007 | LaBossiere et al. |
| 2010/0327479 A1 | 12/2010 | Zinniel et al. |
| 2013/0224423 A1* | 8/2013 | Mikulak ............... B29C 47/025 428/68 |
| 2013/0292881 A1 | 11/2013 | Steiner et al. |
| 2013/0328228 A1* | 12/2013 | Pettis ................... F16M 13/022 264/40.1 |
| 2014/0000747 A1* | 1/2014 | Lasarov .................... B05D 7/22 138/108 |
| 2014/0070461 A1 | 3/2014 | Pax |
| 2014/0134334 A1* | 5/2014 | Pridoehl ................ B05D 1/265 427/256 |
| 2014/0034214 A1 | 6/2014 | Boyer et al. |
| 2014/0265035 A1 | 9/2014 | Buser et al. |
| 2015/0091208 A1 | 4/2015 | Sadusk et al. |
| 2015/0093465 A1* | 4/2015 | Page ................... B29C 67/0088 425/132 |
| 2015/0093588 A1 | 4/2015 | Sadusk et al. |
| 2015/0231829 A1 | 8/2015 | Haider et al. |
| 2016/0101567 A1* | 4/2016 | Van Liew ........... B29C 67/0085 264/245 |

OTHER PUBLICATIONS

"U.S. Appl. No. 14/589,841, Non-Final Office Action dated Jun. 1, 2017", 20 pages.
WIPO, "PCT Application No. PCT/US15/015708 International Preliminary Report on Patentability dated Sep. 1, 2016", 9 pages.
WIPO, "PCT Application No. PCT/US15/015708 International Search Report and Written Opinion dated Jul. 1, 2015", 12 Pages.
USPTO, "U.S. Appl. No. 14/589,841 Notice of Allowance dated Oct. 17, 2017", 13 pages.

* cited by examiner

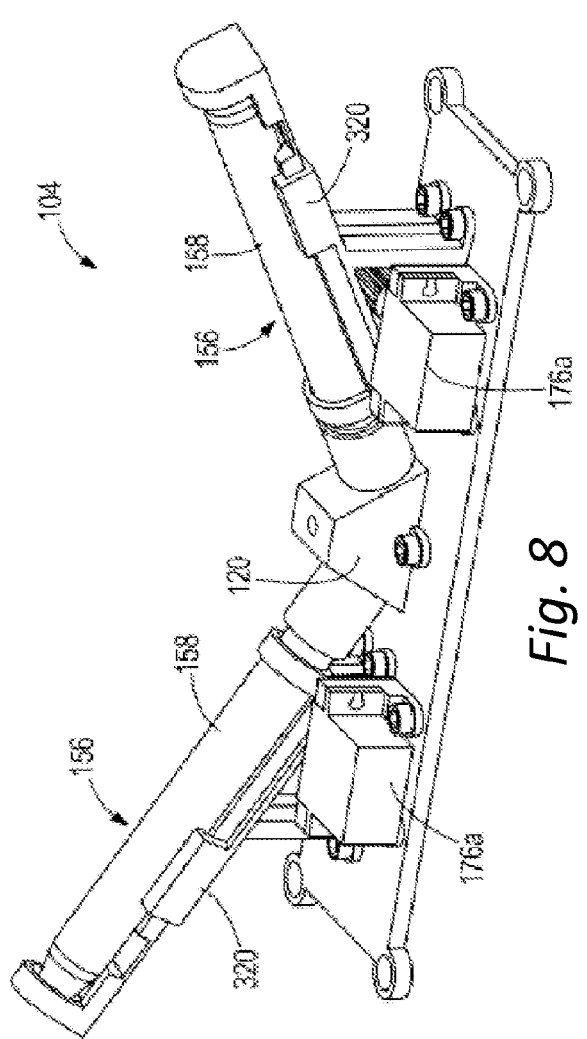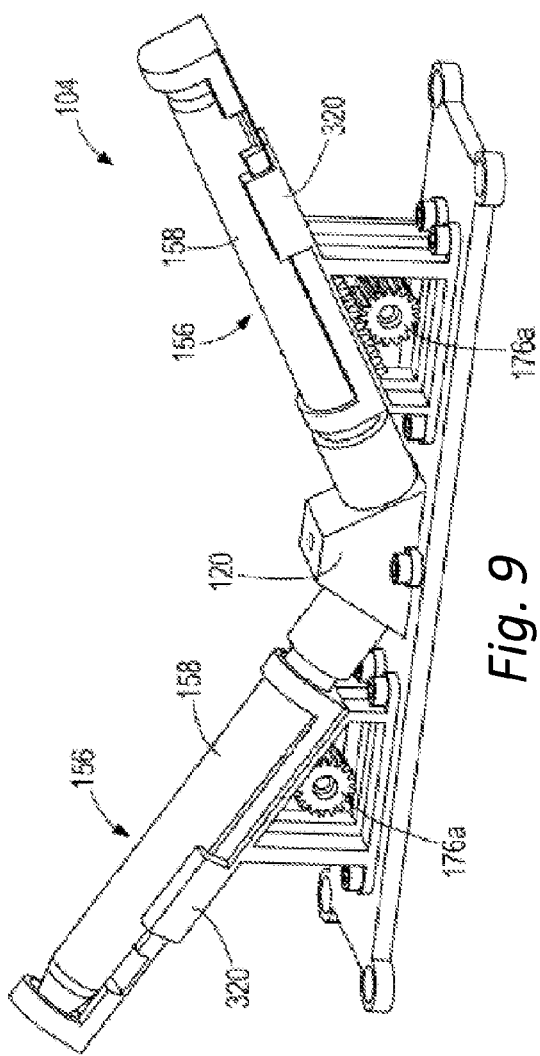

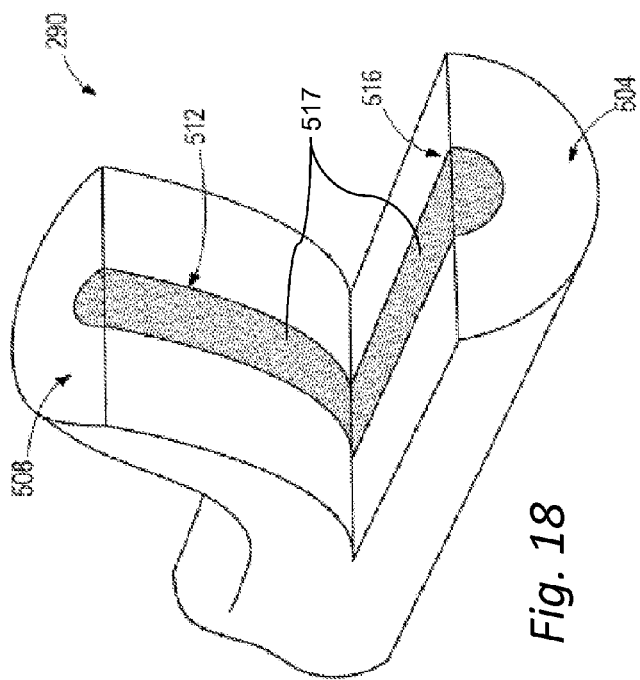
Fig. 18
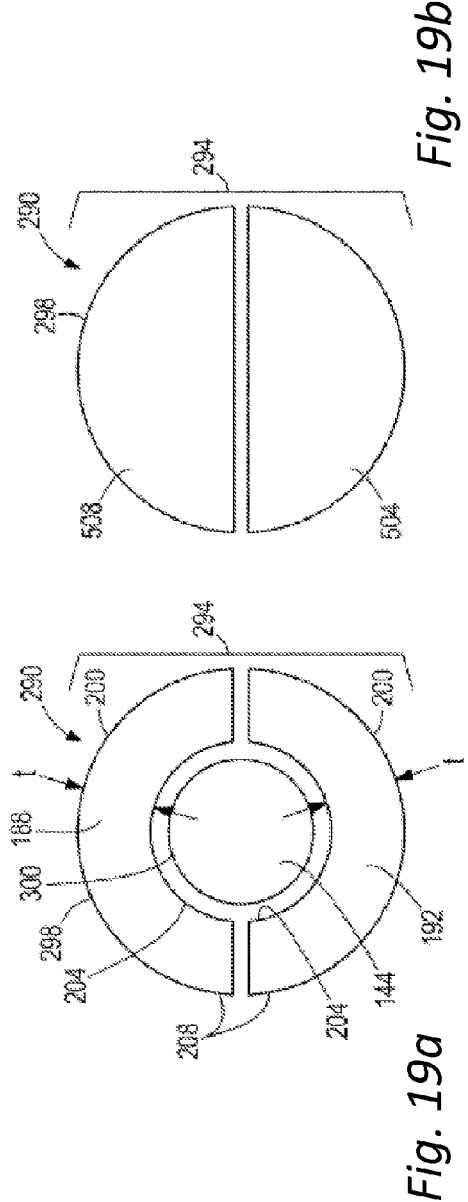
Fig. 19a
Fig. 19b

THREE-DIMENSIONAL PRINTER WITH INTEGRATED COLORING SYSTEM

RELATED APPLICATIONS

This application is a continuation-in-part of U.S. patent application Ser. No. 14/589,841 filed Jan. 5, 2015, which claims priority to U.S. Prov. Pat. App. No. 62/051,944 filed Sep. 17, 2014 and U.S. Prov. Pat. App. No. 61/941,899 filed Feb. 19, 2014, where the entire content of each of these applications is hereby incorporated by reference.

TECHNICAL FIELD

The disclosure relates to a three-dimensional printer with an integrated filament coloring system.

BACKGROUND

Three-dimensional (3D) printing refers to the process of creating a 3D object through an additive process, where successive layers of material are laid down under the control of a computer. Conventionally, a three-dimensional printer can use an extrusion 3D printing process, which refers to a Fused Deposition Modeling (FDM) process or a similar process where a build material is heated and then deposited layer by layer onto a build platform. By adding many thin layers on top of one another, sometimes hundreds or thousands, a 3D object is created.

Typically, 3D printers include at least one printer head, or extruder, containing a nozzle from which the melted build material is extruded onto the build platform to create 3D objects. The build material generally originates from an upstream feed of a raw polymer in the form of a filament. This filament is fed into the upper region of the extruder as a solid, where it is then melted and deposited in its molten form from the extruder nozzle in a continuous stream.

SUMMARY

A three-dimensional printer effects color changes in an extrudate using a color-application unit that applies a colorant to the interior of a filament before the filament is melted within an extruder. Specifically, the color-application unit may receive a filament (or portions of a filament) having an exposed interior surface, where color applicators are actuated to apply one or more colors to the interior surface of the filament in order to modify the extruded color. The filament may then be coupled, collapsed, or otherwise closed about the interior surface, e.g., by a mechanical coupler, to substantially enclose the interior surface of the filament, which is then fed to the extruder for fabricating a colored object in a three-dimensional fabrication process. By enclosing the colored surface within the filament before melting for extrusion, transition effects of a color change can be mitigated and the transition time for a substantially complete change from one color to the next can be significantly reduced.

In one embodiment, the disclosure provides an assembly that is configured to be coupled to and communicate with a 3D printer having a printer head. The assembly includes a color-application unit that is positioned upstream of the 3D printer. The color-application unit is configured to receive a filament and direct the filament to the printer head of the 3D printer. The assembly also includes a color applicator coupled to the color-application unit. The color applicator is operable to selectively apply color to an interior surface of the filament.

In another embodiment, the disclosure provides a method for preparing a filament for use with a printer head of a 3D printer. The method includes receiving the filament at a color-application unit positioned upstream of the 3D printer. The method also includes applying color, by a color applicator coupled to the color-application unit, to an interior surface of the filament. The method further includes directing the filament from the color-application unit to the printer head of the 3D printer.

In another embodiment, the disclosure provides a filament for use with a printer head of a 3D printer. The filament includes an exterior surface and an interior surface having color selectively applied thereto. The color of the interior surface is visible through the exterior surface.

Other aspects of the disclosure will become apparent by consideration of the detailed description and accompanying drawings.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 8 is a perspective, first side view of the color-application unit of FIG. 7.

FIG. 9 is a perspective, second side view of the color-application unit of FIG. 7.

FIGS. 18-20 illustrate filament shapes that can be used in a color-changing system.

DETAILED DESCRIPTION

Figure 1:
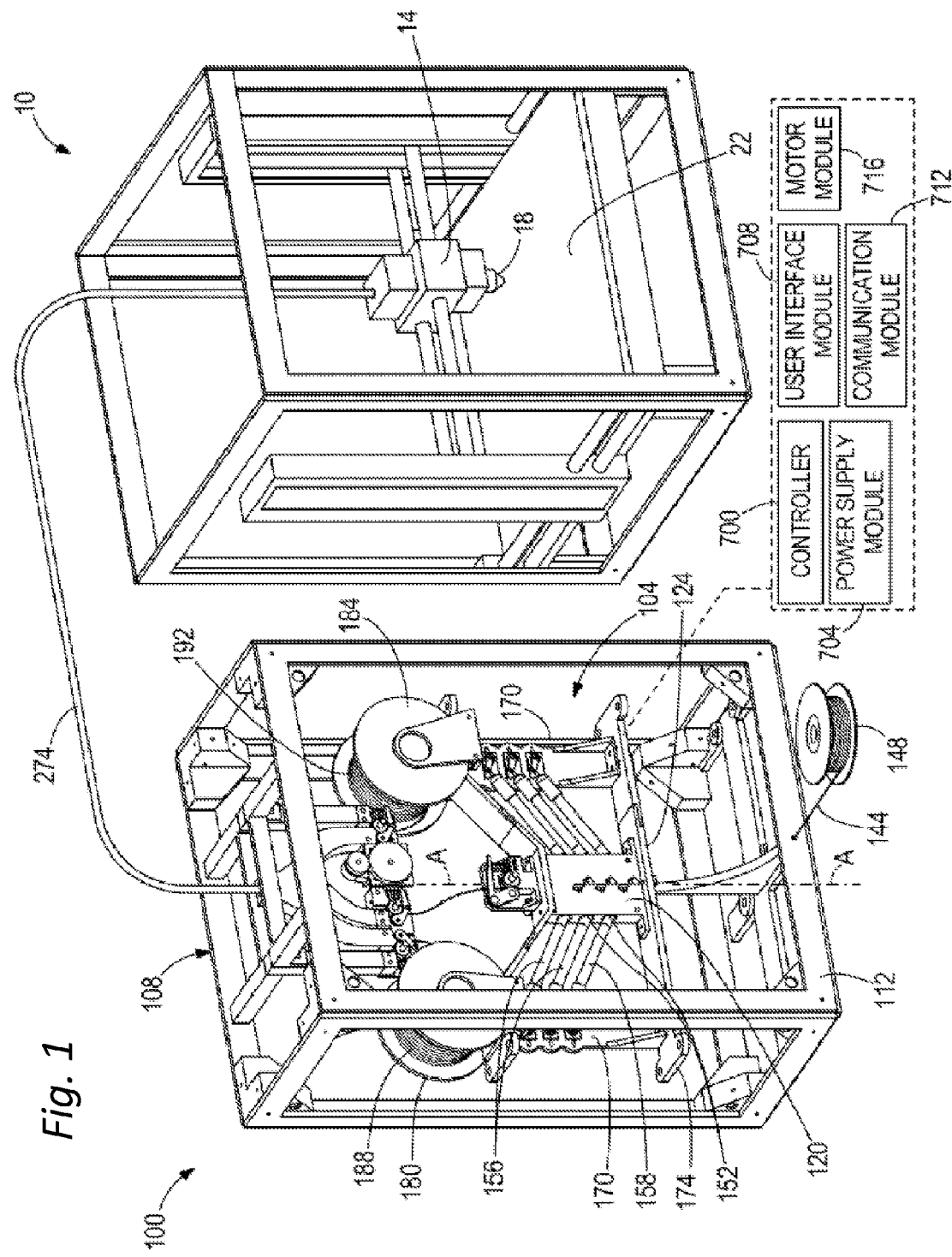
FIG. 1 is a perspective view of a system including a 3D printer and an assembly coupled to the 3D printer, the assembly including a color-application unit, a color applicator, and a coupler.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the following description, terms such as "first," "second," "top," "bottom," "above," "below," and the like, are words of convenience and are not to be construed as limiting unless expressly stated otherwise.

The following description emphasizes three-dimensional printers using fused deposition modeling or similar techniques where a bead of material is extruded in a layered series of two dimensional patterns as "roads," "paths," or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "3D printer," "fabrication system," and so forth, unless a more specific meaning is explicitly provided or is otherwise clear from the context.

Figure 3:
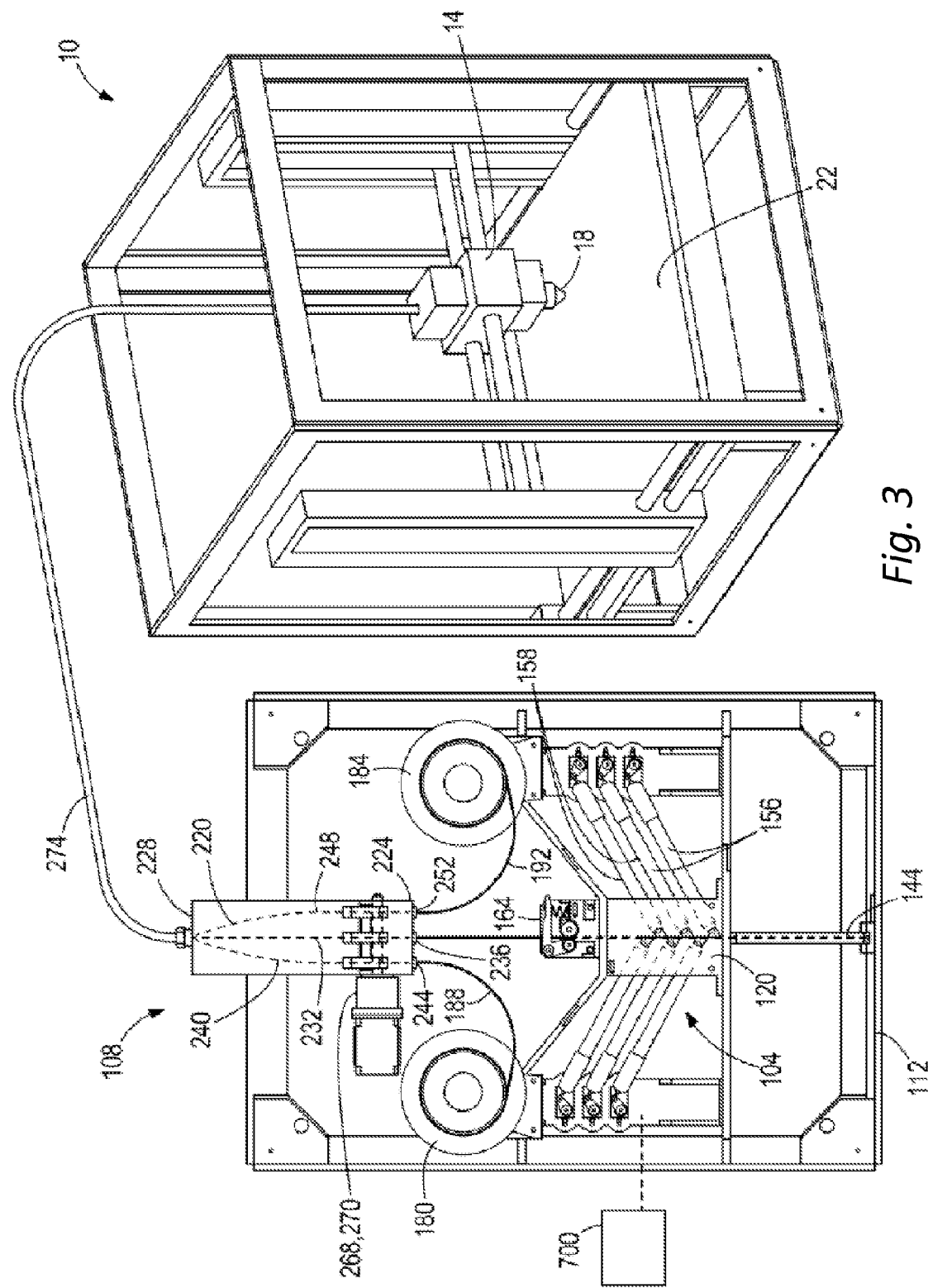
FIG. 3 is a perspective view of a system including the 3D printer and an assembly having a coupler according to another embodiment of the invention.
Figure 15:
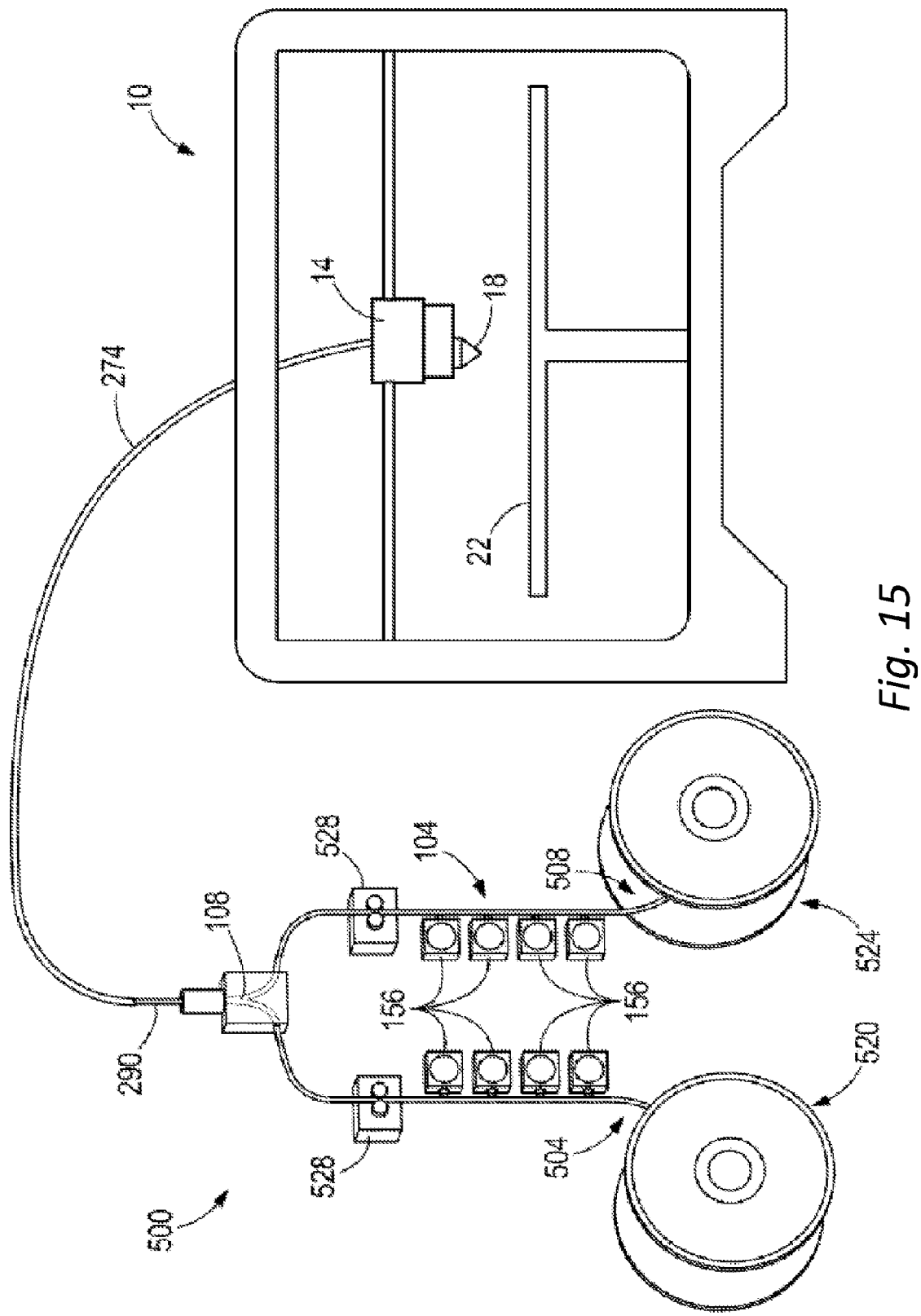
FIG. 15 is a schematic of a system including the 3D printer and an assembly according to another embodiment.

FIGS. 1, 3, and 15 illustrate a 3D printer 10 including a printer head or extruder 14 that has a nozzle 18 and is slidably positioned above a platform 22. The nozzle 18 (FIGS. 5 and 6) includes walls 24 that define a channel 26 extending therethrough. The channel 26 has an inlet 30 and an outlet 34. The channel 26 also has a diameter D that decreases from the inlet 30 to the outlet 34.

Figure 2:
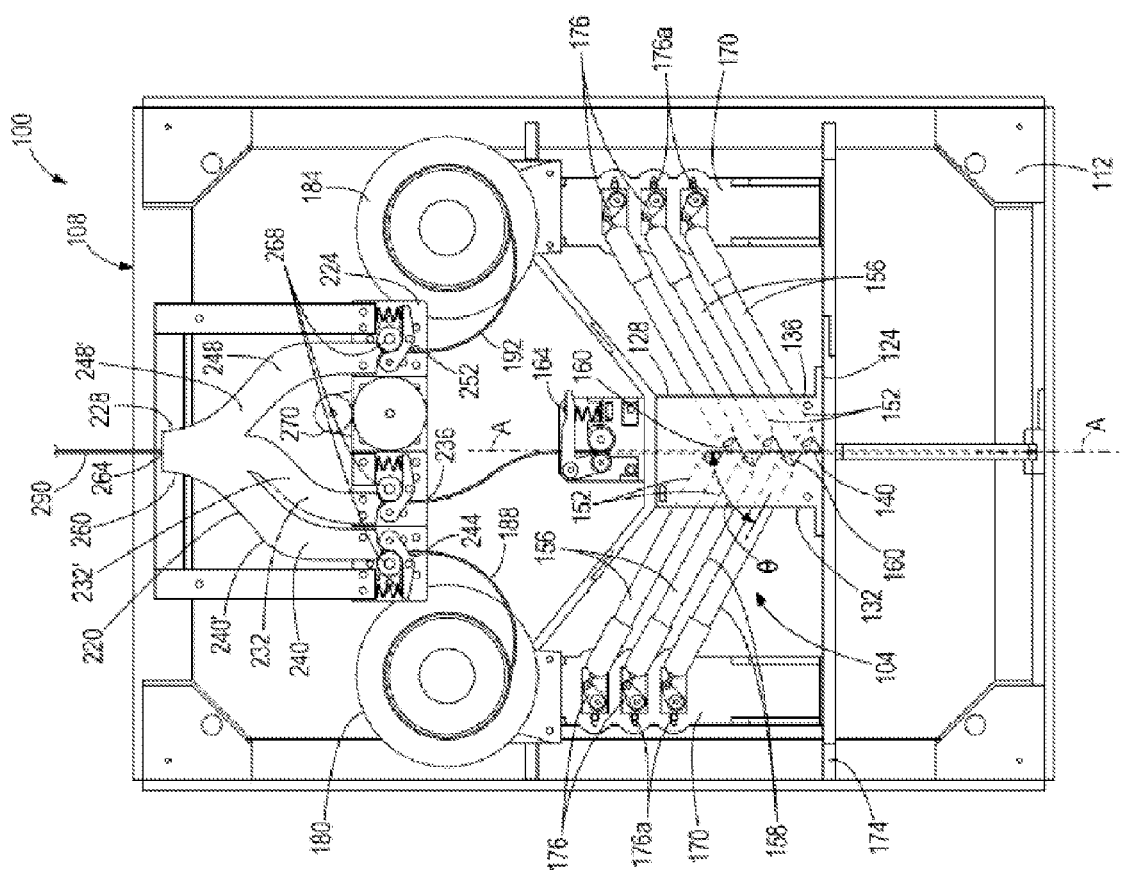
FIG. 2 is a plan view of the color-application unit, color applicator, and coupler shown in FIG. 1.

FIGS. 1-3 illustrate a color-application and feed assembly 100 that is configured to be coupled to and communicate with the 3D printer 10. The illustrated assembly 100 includes a color-application unit 104 and color applicators 156. In the illustrated embodiment, the assembly 100 includes six color applicators 156, but may alternatively include fewer or more color applicators 156. Each color applicator 156 is coupled to (e.g., supported by) the color-application unit 104 to apply color to a surface of a filament (e.g., first filament portion 144 discussed below). The assembly 100 also includes a coupler or annealing unit 108 positioned between the color-application unit 104 and the 3D printer 10. In the illustrated embodiment, the color-application unit 104 and the coupler 108 are coupled to and positioned within a support structure or frame 112.

In the embodiments illustrated in FIGS. 1-3, the color-application unit 104 includes a body 120 that defines a longitudinal axis A. The body 120 includes first end 124, a second end 128, a first side 132, and a second side 136. In the illustrated embodiment, the body 120 is formed as a single piece, but in other embodiments, the body 120 may be formed of separate pieces that are coupled to one another. The body 120 further includes a first channel or conduit 140 that extends from the first end 124 to the second end 128. The conduit 140 is sized and shaped to receive a first filament, or strand, portion 144 from a first spool 148 positioned adjacent the first end 124 of the body 120. The first filament portion 144 may be any suitable material having any suitable size or shape, as discussed in greater detail below. In the illustrated embodiment, the first filament portion 144 is substantially cylindrical or rod-shaped and may have a diameter in the range of 0.5-3.0 mm, with a preferable diameter of about 1.75 mm.

The body 120 also defines through-holes or apertures 152 extending from each of the first side 132 and the second side 136 towards the conduit 140. Each of the through-holes 152 is configured to movably (e.g., slidably) receive one of the color applicators 156. In the embodiment illustrated in FIGS. 1-3 and 7-9, the color applicator 156 is an elongate member 158 that has a color applicator tip 158a. The elongate member 158 contains a color material and dispenses the color material through the tip 158a. For example, the elongate member 158 may be a felt-tip marker or pen. Other embodiments utilize although other types of color applicators 156, which will discussed in greater detail below. Also, in the embodiments illustrated in FIGS. 1-3, the through-holes 152 are oriented at an angle θ relative to the longitudinal axis A (FIG. 2) of the body 120. In some embodiments, the angle θ can range from about 20 degrees to about 70 degrees. In the illustrated embodiment, the angle θ is about 30 degrees. In further embodiment, the angle θ may be larger or smaller than that illustrated herein. In the illustrated embodiment, the body 120 also includes apertures 160 that are oriented generally perpendicular to the longitudinal axis A. Each of the apertures 160 corresponds to one of the through-holes. The apertures 160 enable the color applicators 156, and more particularly the tips 158a, to communicate with the filament portion 144 in the conduit 140 to selectively apply color to the filament portion 144. The apertures 160 give the user the ability to see the color applicators 156, and more particularly the tips 158a, during a visual calibration process.

As shown in FIG. 2, the color-application unit 104 also includes a motor assembly 164. The illustrated motor assembly 164 includes a motor and a roller that engages the filament portion 144. The motor drives (e.g., rotates) the roller to move the filament portion 144 through the conduit 140 of the body 120. In the illustrated embodiment, the motor assembly 164 is positioned above the body 120 to pull the filament portion through the conduit 140. In other embodiments, the motor assembly 164 may be positioned elsewhere relative to the body 120 to push or pull the filament portion 144 through the conduit 140.

Further with respect to FIGS. 1-3, the support structure 112 has two members 170 that are coupled to a support surface 174 on either side of color-application unit 104. The color applicators 156 are coupled to the members 170 by actuators 176 (FIG. 2). In the illustrated embodiment, the color applicators 156 are biased (e.g., by a spring, a cam, a lever, or the like) to a first position such that the color applicator tips 158a are spaced apart from the conduit 14. Each of the actuators 176 is selectively actuatable by (e.g., rotatable, slidable, or otherwise moveable) by a motor 176a. Actuating the actuators 176 moves the color applicators 156 toward the conduit 140 to apply color to the filament portion 144 within the conduit 140.

The illustrated support members 170 also support a second spool 180 and a third spool 184, which include second and third filament, or strand, portions 188, 192, respectively. The second and third filament portions 188, 192 may be any suitable material having any suitable size or shape. With reference to FIG. 19a, in the illustrated embodiment, each of the second and the third filament portions 188, 192 include a substantially C-shaped body 200 having a substantially arcuate groove 204. Accordingly, the second and the third filament portions 188, 192 each define a wall 208 having a thickness t in the range of approximately 0.01-1.5 mm, with preferably thickness of 0.5 mm. The second and the third filament portions 188, 192 are substantially clear or transparent (e.g., colorless).

Referring back to FIGS. 1-3, the coupler 108 is spaced apart from the color-application unit 104 and the spools 148, 180, 184. The illustrated coupler 108 is positioned downstream of the color-application unit 104 and upstream of the 3D printer 10. In the illustrated embodiment, the coupler 108 is suspended above the color-application unit 104. In other embodiments, the coupler 108 may be positioned elsewhere. With respect to FIG. 2, the coupler 108 includes a body 220 having a first end 224 and a second end 228. The body 220 includes a first channel 232 having a first inlet 236, a second channel 240 having a second inlet 244, and a third channel 248 having a third inlet 252. The inlets 236, 244, 252 are positioned at the first end 224 of the body 220. The first, the second, and the third channels 232, 240, 248 extend through the body 220 and converge into a single discharge channel 260 having an outlet 264 at the second end 228 of the body 220. A roller assembly 268 that is actuated by a second motor 270 is positioned adjacent the first end 224 of the coupler 108. A conduit 274 (FIG. 1) extends between the coupler 108 and the printer head 14. In the embodiment illustrated in FIGS. 1-2, the coupler 108 includes first, second, and third portions 232', 240', 248' that are spaced apart from one another through which the first, the second, and the third channels 232, 240, 248 extend, respectively. The first, second, and third portions 232', 240', 248' are coupled to one another to define the discharge channel 260. In the embodiment of FIG. 3, however, the first, second, and third channels 232, 240, 248 are contained within and extend along a substantially rectangular body 220. The first, the second, and the third channels 232, 240, 248 converge within the body 220 adjacent to the second end 228 of the coupler 108 prior to being guided through the conduit 274, as noted above.

In operation and with reference to FIGS. 1-4, the first filament portion 144 is advanced by the first motor 164 from the first spool 148 and moves through the conduit 140 in the body 120 of the color-application unit 104. As the first filament portion 144 advances through the body 120, the color applicators 156 are selectively actuated (e.g., by selectively energizing the motors of the actuators 176) to apply color to a portion of the first filament portion 144. For example, the motor 176a actuates the actuators 176 to slide or move the respective the color applicator 156 towards the conduit 140 and into a second position in which the color applicator tip 158a contacts the first filament portion 144. When the tip 158a engages the first filament portion 144, the applicator 156 applies color to filament portion 144. As used herein, "color" refers to a material or substance (e.g., ink, coating, etc.) that is applied to the filament portion 144 to change or enhance (e.g., brighten or strengthen) the color of the filament portion 144. The color may be any color or mixture of colors, including white.

After a color is applied, the first filament portion 144 is then guided to the first inlet 236 in the coupler 108. At the same time, the second and third filament portions 188, 192 are guided to the second and third inlets 244, 252 of the coupler 108, respectively. Preferably, the second and third filament portions 188, 192 are guided through the coupler 108 such that the grooves 204 (FIG. 19a) face one another. Accordingly, the first, second, and third filament portions 144, 188, 192 are guided through the respective channels 232, 240, 248 from the first end 224 of the coupler 108 to the second end 228. In other words, the motor 270 actuates the roller assembly 268 to advance each of the first, second, and third filament portions 144, 188, 192 through the second, first, and third channels 232, 240, 248, respectively, of the coupler 108. Where the first, second, and third channels 232, 240, 248 converge, the grooves 204 of the second and the third filament portions 188, 192 receive the first filament portion 144 therebetween. Once the first filament portion 144 is positioned between the second and third filament portions 188, 192, the second and third filament portions 188, 192 are pressed together or otherwise mechanically coupled to create a filament 290. The second and third filament portions 188, 192 thereby substantially enclose the first filament portion 144 to create the filament 290. The filament 290, when coupled together, defines a cylindrical shape having a diameter in the range of 1.0 mm to 5.0 mm such that the filament 290 may be used with a suitable 3D printer (e.g., the printer 10 (FIGS. 1 and 3)).

The filament 290 defines a filament profile 294 that includes the first, colored filament portion 144 surrounded or encompassed by the second and the third filament portions 188, 192. As such, the filament 290 includes an exterior surface 298 and an interior surface 300. In the embodiment of the assembly 100 discussed above, the exterior surface 298 is defined by the second and third filament portions 188, 192, and the interior surface includes the first filament portion 144. In the embodiment of FIGS. 1-3 and 19a, the color applied to the filament 290 is applied to surface 300 and covered by surfaces 204 of filament portions 188 and 192. The filament portions 188, 192 are transparent so the color material is visible from the outside of the filament 298.

After the filament 290 is formed, the filament 290 moves from the coupler 108 to the printer head 14 through the conduit 274. The printer head 14 is configured to heat and melt the materials of the filament 290 such that the melted material can move through and be deposited by the nozzle 18 onto the platform 22. In particular, the filament 290 is fed into an upper region of the printer head 14 as a solid, where it is then melted into its molten form. The molten form of the filament 290 is guided through the channel 26 in the nozzle 18 and deposited from the nozzle 18 in a continuous stream. Accordingly, the nozzle 18 deposits the material onto the platform 22 layer-by-layer to build 3D objects from a bottom surface to a top surface.

Figure 5:
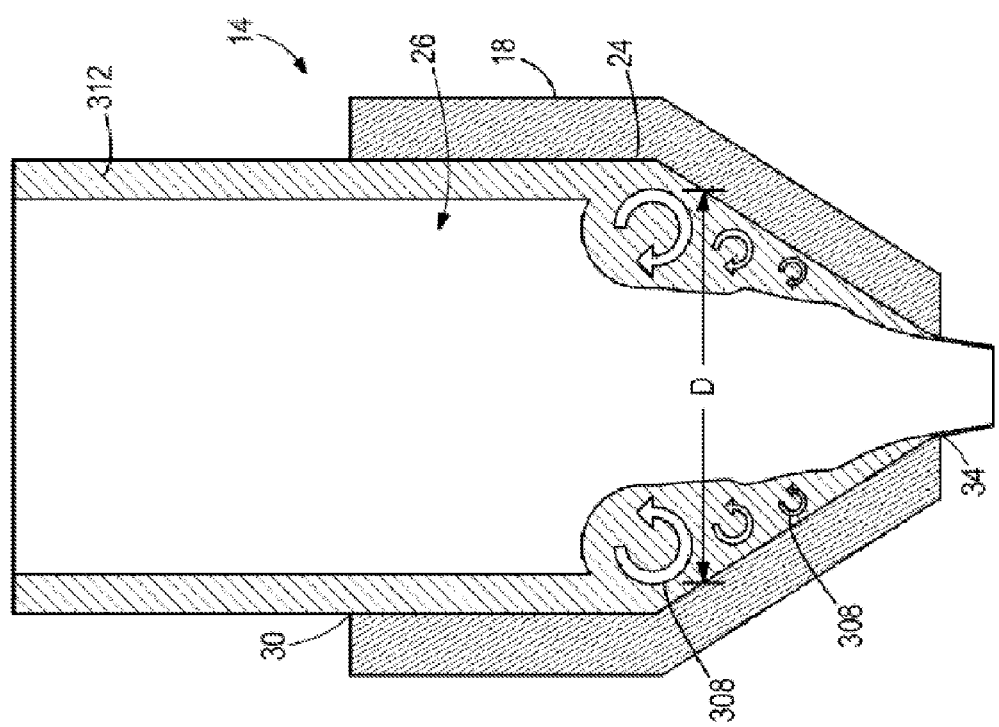

With respect to FIG. 5, typically when a filament 312 is pushed through the nozzle 18, the friction between the walls 24 of the nozzle 18 and the exterior surface of the filament 312 cause the outer portions of the filament 312 to move slower than the remainder of the advancing filament 312. The wall friction creates a velocity profile that can be seen in FIG. 5. As illustrated, the material at the center of the nozzle 18 can be seen moving much faster than the material at the edges. This causes some of the material from the outermost edges of the filament 312 to be left behind and mixed into the filament later on in the printing process.

Figure 6:
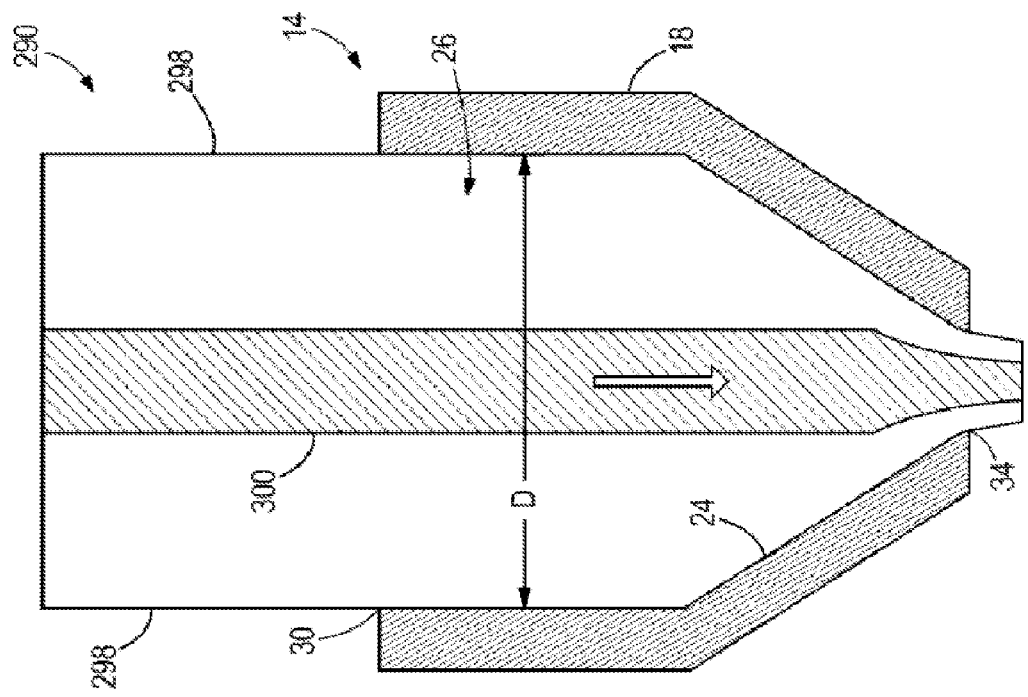
FIGS. 5 and 6 illustrate a schematic diagram of fluid flow through a nozzle of a 3D printer head.

Additionally, when the extrusion nozzle 18 decreases in diameter, stagnant flow or eddies 308 (FIG. 5) occur. Eddies commonly form around sharp transitions in the flow within the nozzle 18. Eddies 308 cause the material to slowly circulate. As this material slowly circulates, it pulls additional material from the outer edges of the new material flowing past the eddies 308, and pushes old material back into the material currently flowing by. FIGS. 5 and 6 illustrate the effect of introducing the color to the exterior surface of a filament. As illustrated in FIG. 6, when color is applied an interior surface of the filament (in accordance with the present invention), the color is prevented from sticking to the walls 24 of the nozzle 18 and getting caught in eddies 308 during nozzle diameter changes.

Figure 23:
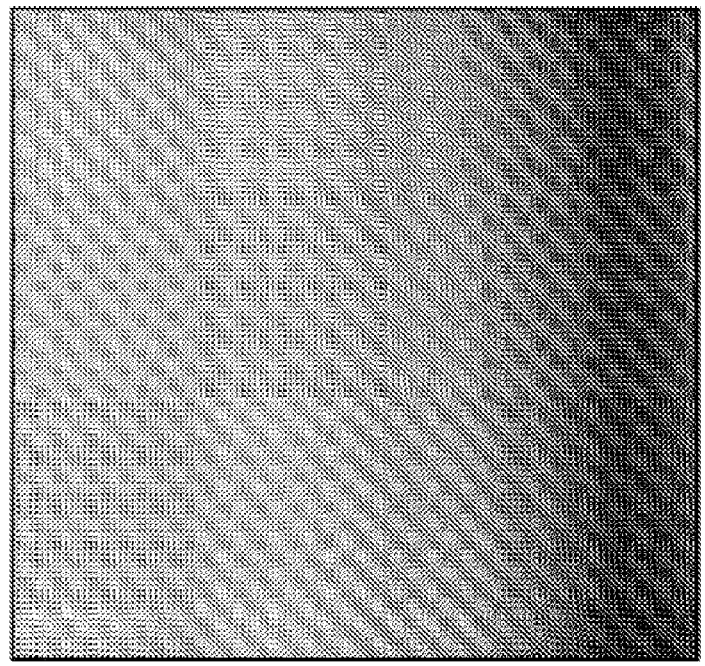
FIG. 23 illustrates a 3D object produced using conventional coloring techniques.

In accordance with preferred embodiments discussed herein, color is applied to the interior surface 300 of the filament 290. However, in other embodiments color can be applied to the surfaces 204 of elements 188 and 192, or to all of the inner surfaces 204 and 300 of the filament 290. Having color only on the inner portions or surfaces of the filament 290 overcomes the problem of cleanly transitioning from one color to another. In other words, while color can also or alternatively be added directly to an exterior surface of the filament 312 or other build material in the above-described continuous process, if the color is applied to the exterior surface or the filament 290 transitioning from one color to another requires an extended period of time to flush the previous color material out of the nozzle because colored material will be left behind as a result of the wall friction, as described above. Additionally, eddies 308 can be responsible for producing old colors once a new color has already been fully realized if color is on an exterior surface of the filament. A 3D object that has been colored using a filament that has color on an exterior surface is illustrated in FIG. 23.

Figure 24:
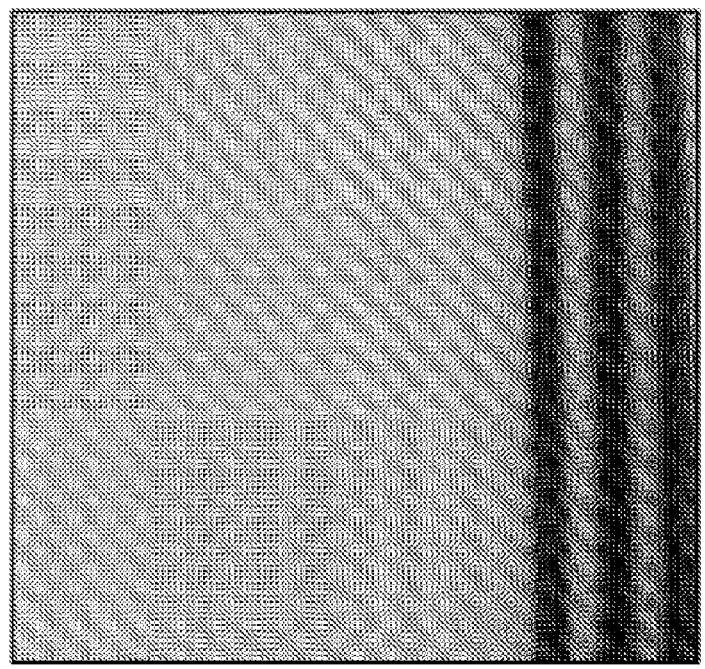
FIG. 24 illustrates a 3D object produced using the assemblies of FIGS. 1-3.

In contrast, adding color to the interior surfaces 300 of the filament 290 substantially eliminates the issues caused by both wall friction and eddies 308 and, therefore, streamlines switching among different colors. This is because the first, colored filament portion 144 (e.g., the interior surface 300 of the filament 290) is surrounded by the second and third filament portions 188, 192 (e.g., the exterior surface 298), which are substantially clear or transparent. Accordingly, the material left behind is also substantially clear or transparent and does not affect subsequent colors being run through the nozzle 18. In other words, color is inhibited from sticking to the walls 24 of the nozzle 18 and getting caught in eddies 308 during diameter changes of the nozzle 18. A 3D object that has been colored using the filament 290 described above, that is with color on the interior surface 290, is illustrated in FIG. 24. The comparison between FIGS. 23 and 24 illustrates how colors can change more quickly or sharply (e.g., within fewer layers) and how the color is less blurred in the 3D object of FIG. 24. For example, the transition distance between colors applied to the center of the filament is 0-5 cm, whereas the transition distance between colors when coloring the exterior of the filament ranged from 10-100 cm. This 95% reduction in transition distance allows the 3D printer 10 to be used to produce more detail when coloring parts.

The color-application unit 104 may have other configurations other than those illustrated in FIGS. 1-3 for applying color to interior surfaces of the filament 290. For example, in the embodiment of FIGS. 1-3, the color-application unit 104 is configured to hold three color applicators 156 on each side of the body 120. However, in the embodiment illustrated in FIG. 7-9, a color-application unit 104 can accommodate only one color applicator 156 on each side of 120. Therefore, multiple color-application units 104 may be positioned appropriately relative to one another to administer different colors to the first filament portion 144. The illustrated color-application unit 104 of FIGS. 7-9 allow the system be easily scaled to accommodate any desired number of different colors (e.g., two, four, ten, twenty, etc.).

Figure 7:
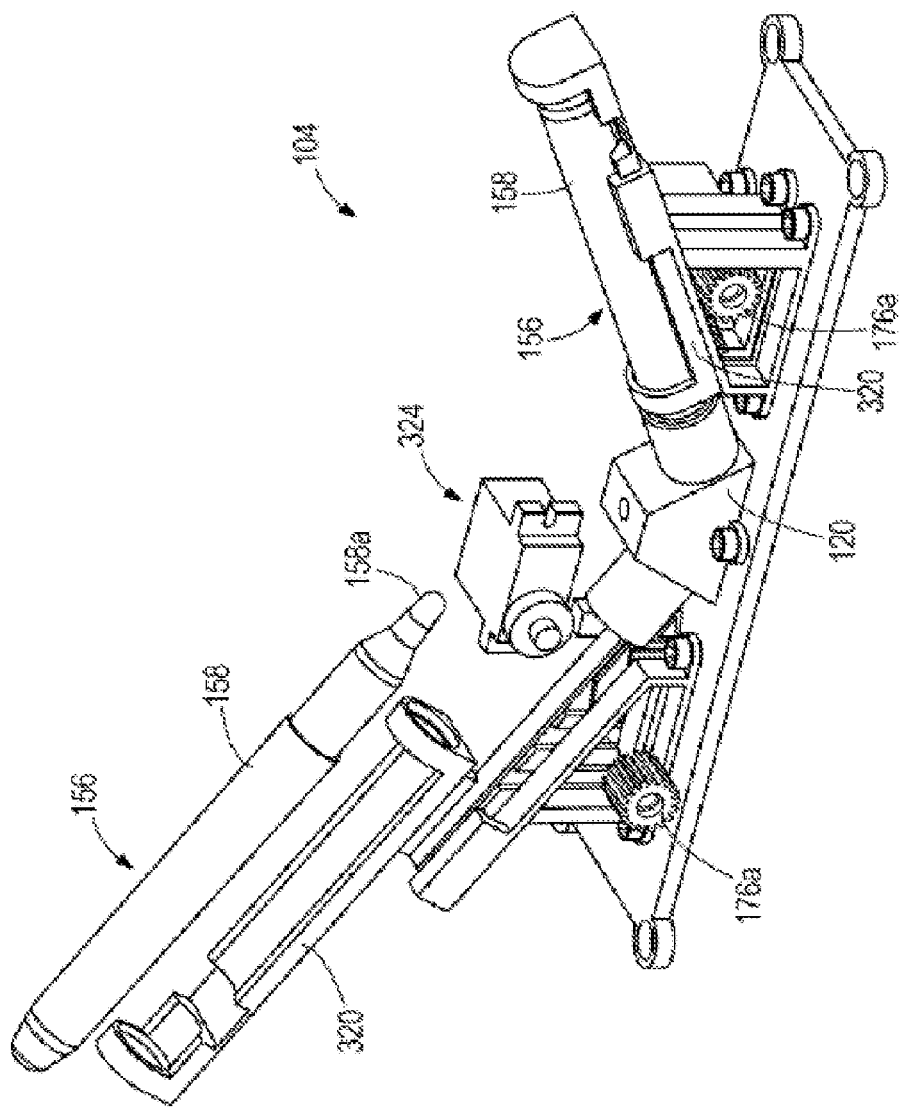
FIG. 7 is an exploded perspective view of another color-application unit for use with a 3D printer.

Further with respect to FIGS. 7-9, the color-application unit 104 is configured to removably receive color applicators 156 on each side of the body 120. In particular, the color-application unit 104 includes holders or holsters 320 that are each configured to removably receive one of the color applicators 156. Each color applicator 156 is secured into place in the holster 320. Each color applicator 156 is also engaged or disengaged by a motor 176a to control when the color is dispensed onto a portion of the first filament portion 144 to apply the color. The color applicators 156 can be changed out for different color applicators 156 containing different colors, as needed.

Figure 11:
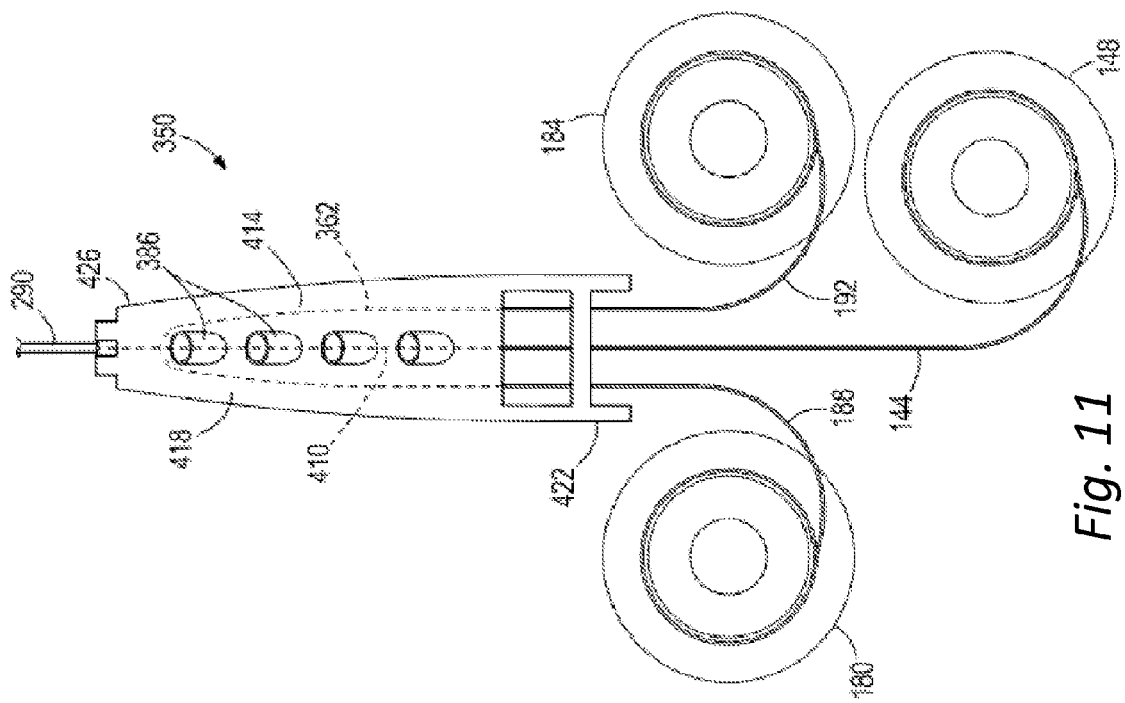
FIG. 11 is a side view of the color-application unit of FIG. 10.
Figure 10:
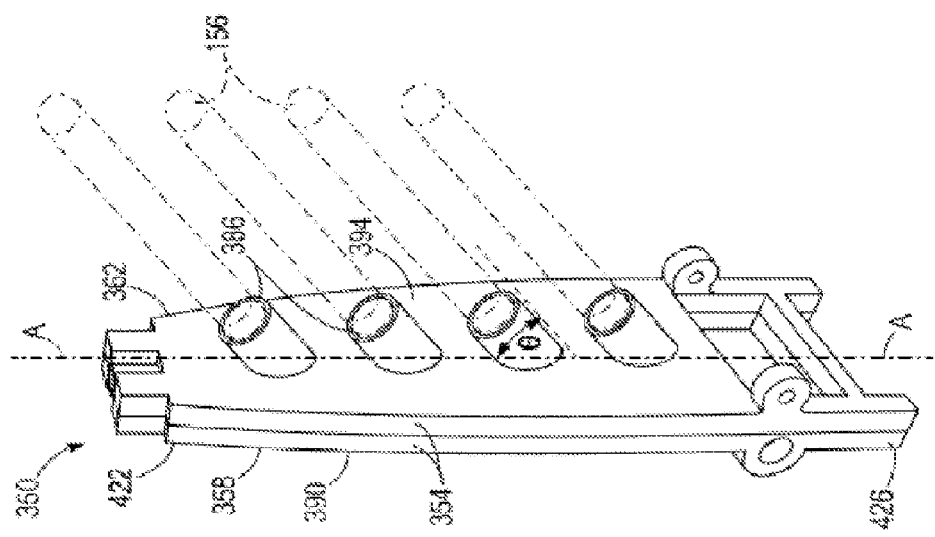
FIG. 10 is a perspective view of another color-application unit for use with a 3D printer.
Figure 12:
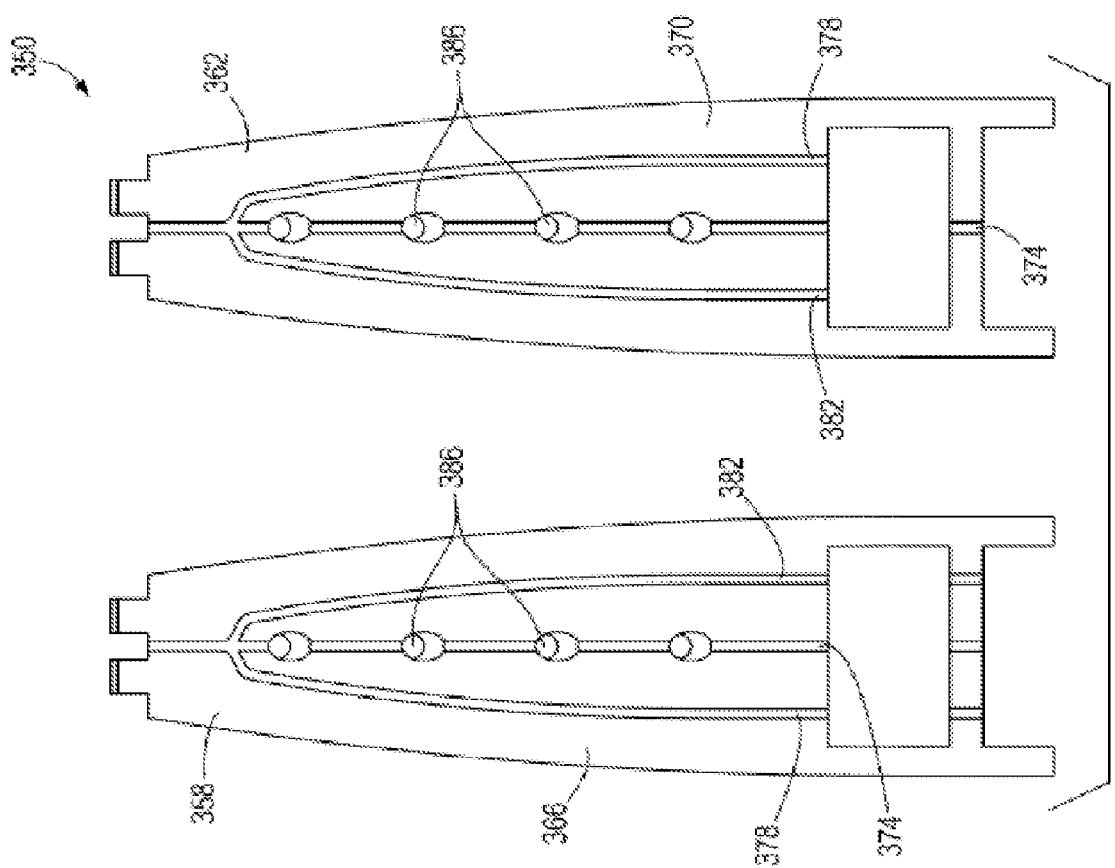
FIG. 12 is an exploded view of the color-application unit of FIG. 10.

While the color-application unit 104 and the coupler 108 are configured as separate structures in the embodiments of FIGS. 10-12, in other embodiments, the color-application unit and the coupler may integrated into a single unit or structure (e.g., color-application unit 350 illustrated in FIGS. 10-12).

As shown in FIGS. 10-12, the color-application unit 350 includes a body 354 having a first member 358 that is coupled to a second member 362. An interior surface 366, 370 of each of the first and the second members 358, 362 defines three grooves 374, 378, 382. The first groove 374 is positioned between the second groove 378 and the third groove 382. Additionally, through-holes or apertures 386 extend from an exterior surface 390, 394 of each of the first member 358 and the second member 362 to the interior surface 366, 370 of each of the first member 258 and the second member 362. Each of the through-holes 386 is configured to slidably receive a color applicator 156. Also, in embodiment illustrated in FIGS. 10-12, the through-holes 286 are oriented at an angle θ relative to the longitudinal axis A. In some embodiments, the angle θ can range from about 20 degrees to about 70 degrees. In the illustrated embodiment, the angle θ is about 45 degrees. In further embodiments, the angle θ may be larger or smaller than that illustrated herein.

When the first member 358 and the second member 362 are coupled together, the first grooves 374 define a first channel or conduit 410, the second grooves 378 define a second channel 414, and the third grooves 382 define a third channel 418. The first, second, and third channels 410, 414, 418 extend from a first end 422 of the body 354 to a second end 426 of the body 354. At the first end 422 of the body 354, the first, second, and third channels 410, 414, 418 are spaced apart from one another. As the channels progress through the body 354, the distance between adjacent channels decrease until the three channels 410, 414, 418 converge into a single discharge channel near the second end 426 of the body 354. A motor assembly (similar to the motor assembly 164 discussed above) can be positioned adjacent to the first end 422 of the body 354 and can include rollers that engages the filament portions 144, 188, 192 to drive the filament portions 144, 188, 192 through the body 354.

In operation, the first, second, and third filament portions 144, 188, 192 are pulled by the motor assembly from their respective spools 148, 180, 184. The first, second, and third filament portions 144, 188, 192 move through the first, second, and third channels 410, 414, 418, respectively, in the body 354 of the color-application unit 104. As the first filament portion 144 moves through the body 354, the color applicators 156 are selectively actuated to apply color to the first filament portion 144, as discussed above with respect to FIGS. 1-3. Near the second end 422 of the body 354, the filament portions 144, 188, 192 converge (as discussed above with respect to the embodiment of FIGS. 1-3) to create the filament 290, which is guided to the 3D printer 10. In particular, in the embodiment of FIGS. 10-12, the second and third channels 414, 418 guide the second and third filament portions 188, 192 to each gradually make a 90 degree turn so that the filament portions 188, 192 wrap around the first filament portion 144 as they exit the body 354.

In the embodiments of FIGS. 1-3 and 7-10, the color applicators 156 are elongate members 158 (e.g., markers) that contain and dispense color, as discussed above. In other embodiments (FIGS. 13 and 14), however, the color applicators 156 of the color-application unit may be inkjet cartridges 450. In some embodiments, the cartridges 450 are piezoelectric inkjet cartridges that are actuated via a processor to selectively apply color to the first filament portion 144.

The piezoelectric inkjet cartridge 450 includes a printhead 454 that uses a pulse generator to provide an electric signal. The signal is applied across piezoelectric crystal plates, one of which contracts and the other of which expands, thereby causing the plate assembly to deflect toward a pressure chamber. This causes a decrease in volume, which imparts sufficient kinetic energy to the liquid dye in the printhead nozzle 458 so that an ink droplet of the liquid dye is ejected from an opening in the printhead 454. Examples of suitable piezoelectric-activated inkjet cartridges 450 may be found in U.S. Pat. Nos. 4,549,191; 4,584,590; 4,887,100; 5,016,028; 5,065,170; and 5,402,162.

The liquid dyes may be contained within a plurality of feed containers equipped with metering devices (not shown) to control the rate and amount of dye or other compositions applied to the filament 10.

Figure 13:
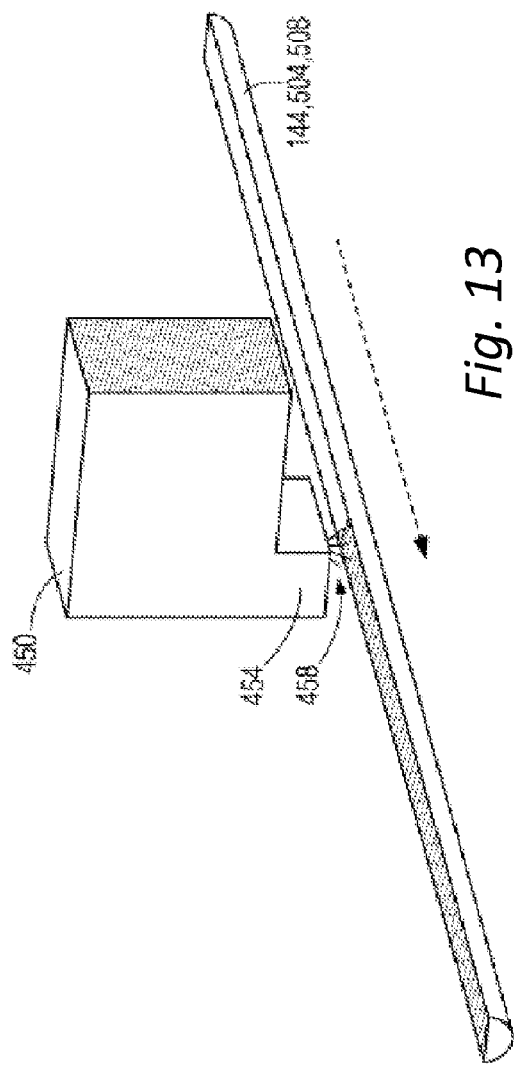
FIGS. 13 and 14 illustrate another color-application unit for use with a 3D printer.
Figure 14:
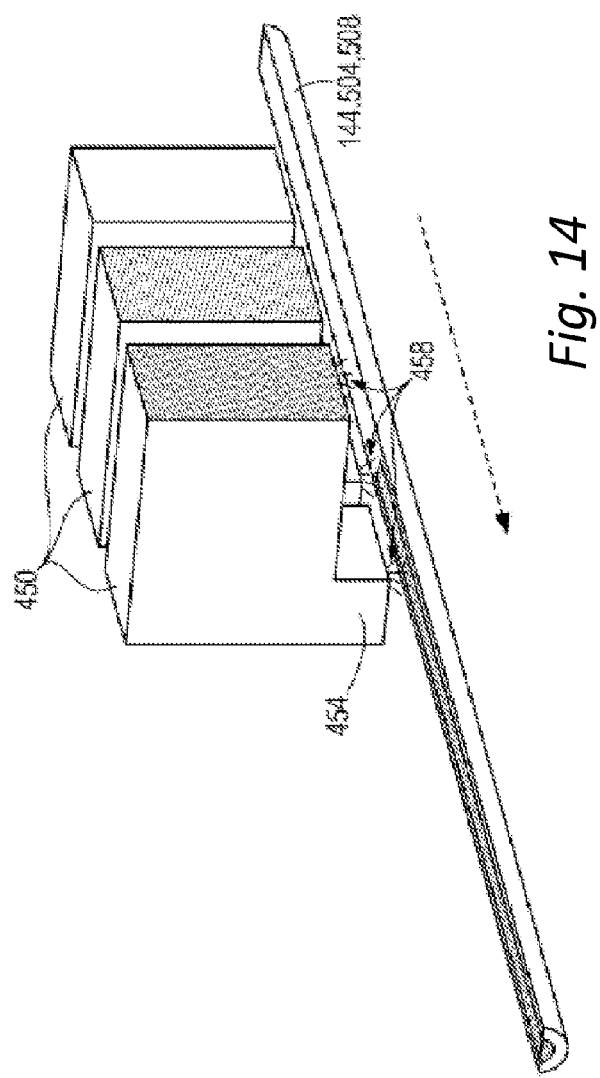

FIG. 13 illustrates the use of one piezoelectric inkjet cartridge 450 to apply color in the form of a liquid dye. FIG. 14 illustrates the use of multiple inkjet cartridges 450 to apply multiple colors to achieve a greater breadth of color options for the final 3D object.

In additional or alternative embodiments, the color applicator 156 may be a thermal inkjet, pressure inkjet, a piezo pump, a pressure pump, a spray mechanism (e.g., using air or pressure), a microfluidic device (e.g., a syringe system), or a stamping or rubber applicator.

In some embodiments, a "fixing region" may be included downstream from the color-application unit 104 where the color is completely or partially fixed to the filament portion 144. For the purposes of the present technology, "fixing" refers to ensuring incorporation of the color on the surface of at least a portion of a filament prior to the coupler. This fixing may be due to polymerization, binding, drying, hardening, crosslinking, addition reaction, or any other process that ensures the color remains incorporated on the filament portion 144 during and after the printing process. For example, in some embodiments the fixing region may be a thermal drying unit (not shown) and/or may include a gas, air jet, or fan (not shown) to assist in drying or otherwise fixing the color to the filament portion 144. Still in other embodiments, the color on the filament portion 144 may be air-dried over a period of time prior to entering the coupler.

Figure 17:
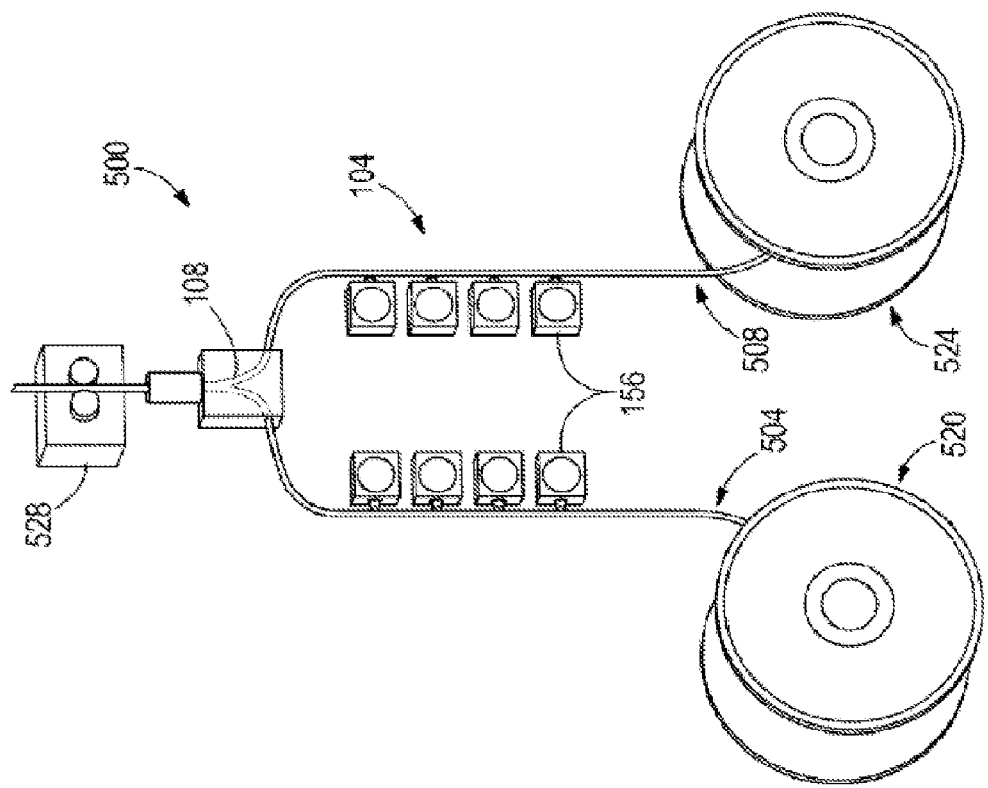
FIG. 17 is a schematic of another assembly for use with a 3D printer.
Figure 16:
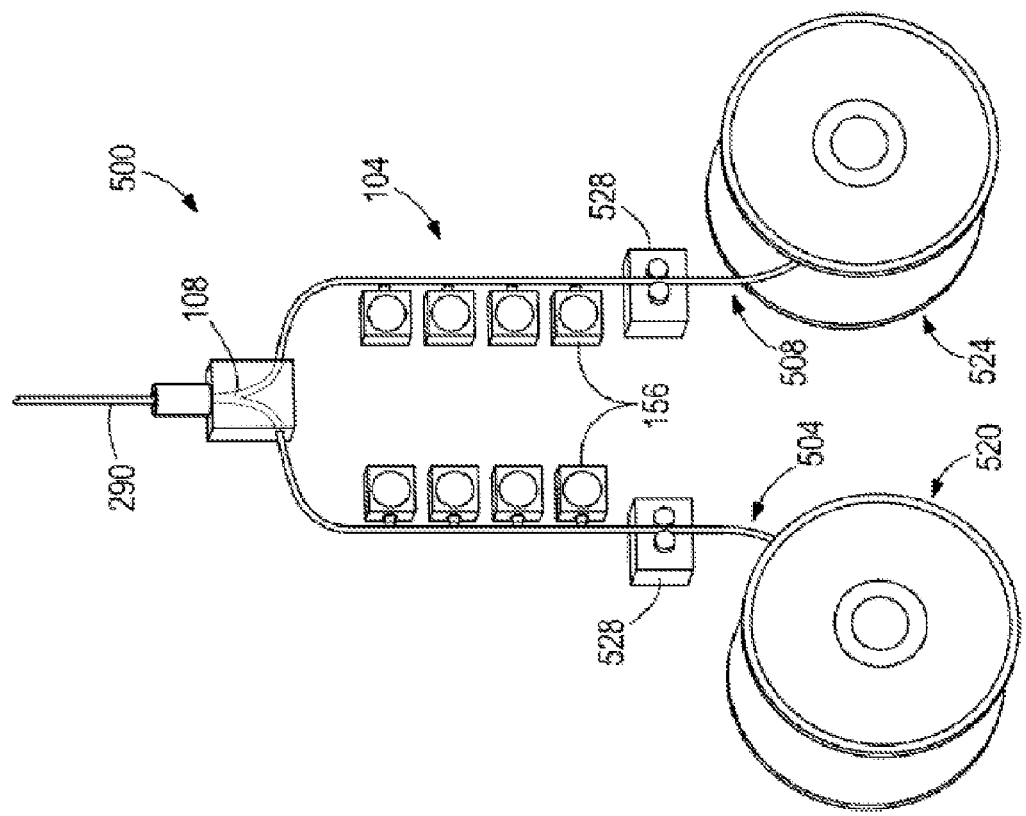
FIG. 16 is a schematic of the assembly of FIG. 15.

The embodiments illustrated in FIGS. 1-3 and 10-12 illustrate color-application and feed assemblies in which three filament portions 144, 188, 192 are combined or coupled to create the filament 290 that is fed to the 3D printer. It should be understood, however, that the filament 290 may be constructed from fewer or more filament portions. For example, FIGS. 15-17 illustrate color-application and feed assemblies 500 in which two filament portions 504, 508 are combined or coupled to create the filament 290 that is fed to the 3D printer. As illustrated in FIGS. 18 and 19, first and second filament portions 504, 508 include a half-cylinder filament profile 294. The half-cylinder filament portions 504, 508 may be constructed from splitting formerly cylindrical filament or may be manufactured as such. Accordingly, color is applied to an interior surface 512, 516 of each of the first and the second filament portions 504, 508. In some embodiments, the two filament portions 504, 508 may be split to expose the interior surfaces 512, 516 and apply color, yet still remain connected together.

As shown in FIGS. 15-17, the color is applied to the interior surfaces 512, 516 of the filament portions 504, 508 via the color applicators 156 before the first and the second filament portions 504, 508 are coupled together to create the filament 290. This allows the on-demand or continuous incorporation of color to the interior surfaces 300 of the filament 290, as opposed to coating the exterior surface 298 of the filament 290, allowing for enhanced multi-coloring of 3D objects.

Figure 4:
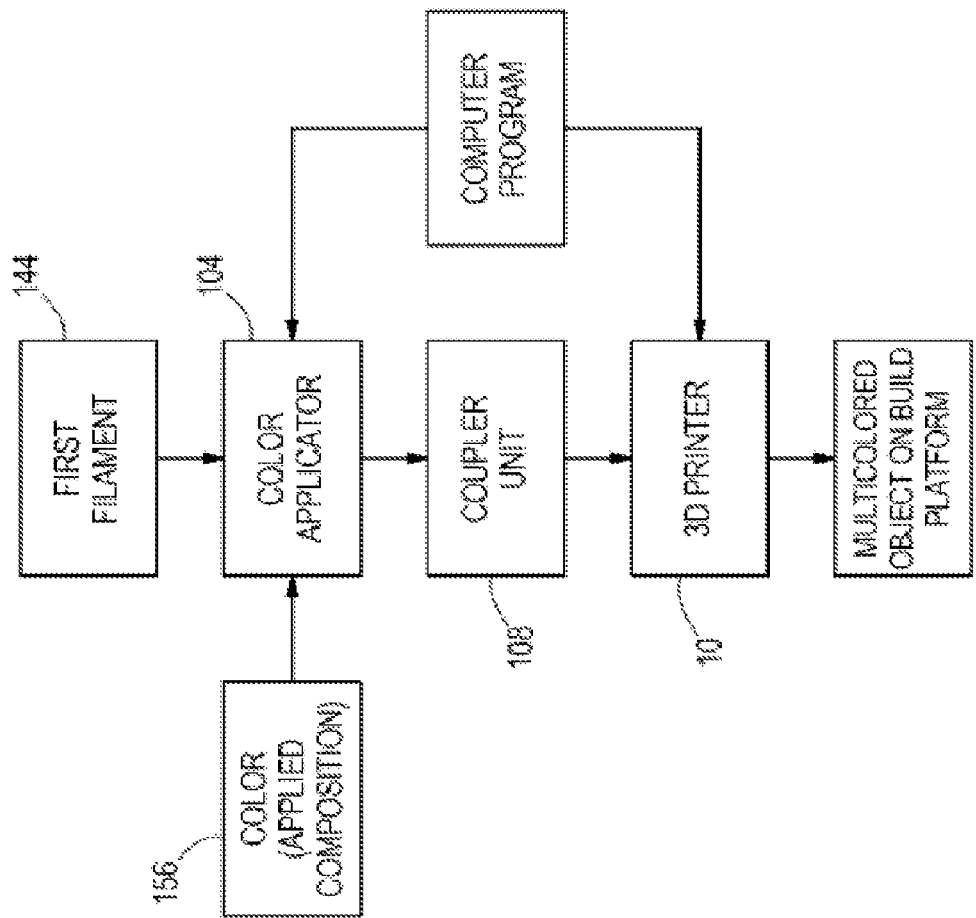
FIG. 4 is a schematic view the systems of FIGS. 1-3.

The schematic diagram of FIG. 4, discussed above, also applies to the operation of the color-application and feed assembly 500 of FIGS. 15-17 and the 3D printer 10. With respect to FIG. 15, each filament portion 504, 508 are introduced to the color applicator 104. In particular, each of the filament portions 504, 508 are pulled from their respective spools 520, 524 through the color-application unit 104 by motorized rollers 528, one for each filament portion 504, 508, respectfully. In other embodiments, the motorized rollers 528 may be alternatively controlled by a single motor, which may be the same motor that also controls a feeder in the 3D printer 10. The motorized rollers 528 pull each filament portion 504, 508 through the color-application unit 104 and into the coupler 108 at the same rate. Alternatively, each motorized roller 528 may be controlled by separate motors working at the same rate. Accordingly, one or more colors are applied to the interior surfaces 512, 516 of the filament portions 504, 508, as directed by the user. After applying the color to the surface 512, 516 of the filament portions 504, 508, the two filament portions 504, 508 are joined together in the coupler 108 to create the filament 290. The colored surfaces 512, 516 of the filament portions 504, 508 make up interior surfaces 300 of the filament 290. Once coupled, the filament 290 is introduced to the 3D printer 10, where the filament 290 is heated and extruded from the extruder nozzle 18 layer by layer onto a build platform 22, as discussed above. This results in a multicolored 3D object.

FIGS. 16 and 17 illustrate alternative placements of the motorized rollers 528 that could be used to control and guide the filament portions 504, 508 to the 3D printer. FIG. 16 includes the set of motorized rollers 528 upstream of the color-application unit 104. FIG. 17 illustrates the use of a single motorized roller 528 downstream from the coupler 108 and upstream of the printer head 14.

It may be preferable to use any combination of these or other motorized roller 528 placements to convey the filament portions 504, 508 to the 3D printer 10. It may also be preferable to include additional braking rolls and a guiding system (not pictured) to provide consistent tension in each filament portion 504, 508 as they are pulled through the color-application unit 104 and introduced into the coupler 108.

Figure 20:
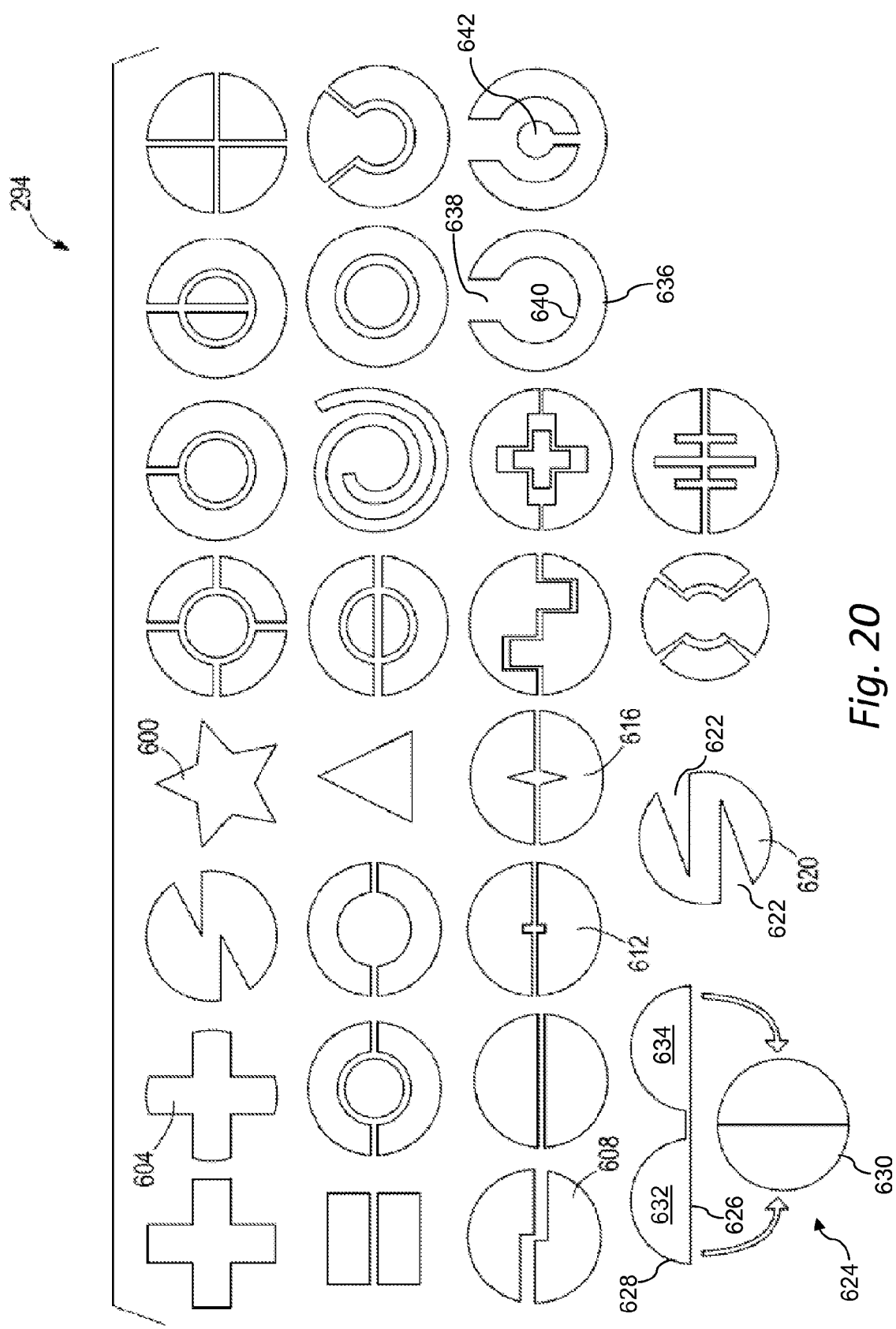

FIGS. 18-20 illustrate filament shapes that can be used with a color-changing system as contemplated herein. As shown in FIG. 18, the filament 290 may include one or more filament portions 504, 508 having interior surfaces 512, 516 therein. In an aspect with two filament portions 504, 508 (such as the implementation shown in the figure), the filament 290 may include a bifurcated filament. One skilled in the art will recognize that additional filament portions 504, 508 are also possible (e.g., three or more), or the filament may be a single piece filament. In the bifurcated filament shown in the figure, the two filament portions 504, 508 may each represent about one-half of the filament 290. One or more of the filament portions 504, 508 may include a void, groove 517, or other cutout. For example, the one or more filament portions 504, 508 may include a groove 517 such that it resembles a pipe bisected along its longitudinal axis (i.e., an elongated half-pipe). As explained herein, one or more of the filament portions 504, 508 may travel through a coloring device or system where dye is applied to one or more of the grooves 517 (or otherwise to an interior surface of the filament 290) and then the portions of filament are joined together to form a single piece of filament (e.g., through heat applied by a coupling device, crimper, or the like). In an embodiment, color is applied to each of the filament portions 504, 508. In another embodiment, color is only applied to one portion of the filament 290. In an embodiment, each of the filament portions 504, 508 may include a groove 517, or only one portion of the filament 290 may include the groove 517. The filament portions 504, 508 may be completely separate from one another before coupling. In another aspect, the filament portions 504, 508 may be adjoined or connected in some manner, but can be split apart (or otherwise separated, e.g., completely or partially) for the application of color. This may be advantageous when coupling the filament, or otherwise reforming it to conform to resemble a standard filament strand of the prior art.

In additional or alternative embodiments, a single filament or greater than three filament portions may be used. FIG. 20 illustrates several examples of potential filament profiles (e.g., cross-sections) that could be used to apply color to an interior surface of a filament. The examples illustrated in FIG. 20 are not intended to be an exclusive list. For example, FIG. 20 illustrates several examples of additional filament profile shapes, including single, whole filament strands, third strands, and quarter strands that may be used to improve coupling and/or color application and subsequent saturation and is not intended as an exhaustive list. Therefore, filaments 290 comprising between one and six coupled filament portions may be colored by one of the color-application units described herein and introduced into a coupler for use with a 3D printer 10.

While the exemplary filament profiles 294 are by no means exhaustive, the filament profiles may be configured as a "star" shape 600 or "cross" shape 604. Further the filament profiles may be a "step shaped" profile 608, a "notch shaped" profile 612, "diamond-notch shaped" profile 616, "Z-shaped" profile 620 or other variations either included in FIG. 20 or otherwise. Other example of filament profiles may include a "tooth-and-comb" shape or a "notch-and-lock" shape.

The "Z-shaped" profile 620 shown in FIG. 20 may include one or more grooves 622 exposing an interior surface for coloring. The grooves 622 may be sized and shaped to cooperate with color applicators for coloring the interior surface of the filament. In other words, the size and shape of the grooves 622 may correspond with the size and shape of the applicator(s). For example, in the figure, the grooves 622 are shown as substantially triangular cutouts, which may correspond to a substantially triangular-shaped color applicator tip. As shown in the figure, the grooves 622 extend substantially through the profile of the filament in an implementation, but other implementations with deeper or shallower grooves 622 are also or instead possible.

A deformable profile 624 made of a single piece of filament may also or instead be used in the devices, systems, and methods discussed herein. The deformable profile 624 may include a single piece of filament that can be manipulated, deformed, re-shaped, reconfigured, bent, folded, crimped, and the like. In an aspect, the deformable profile 624 is deformable to close or seal (or substantially close or seal) its interior surface 626. For example, the deformable profile 624 may include a first state 628 in which the interior surface 626 is exposed (or partially exposed, e.g., through a movable/deformable wall or membrane), and a second state 630 in which the interior surface 626 is unexposed (or partially unexposed, sealed, closed, and so on). In an implementation, the deformable profile 624 includes one or more sections (e.g., a first half 632 and a second half 634) joined together, where the sections can be reshaped to resemble the profile of a standard filament, e.g., a rod, a tube, a ribbon, a strand, and so on. In this manner, the filament need only be reshaped, and not mechanically coupled, in order to be fed into a standard extruder of a three-dimensional printer. The reshaping of the filament may instead include crimping, coupling, sealing, heat treating, adhering, and so on, e.g., to secure the filament in its reshaped state. Alternatively, as stated above, the reshaping may simply involve manipulating or deforming the filament without a need for any mechanical or thermal attachment. In aspects, only certain portions of a length of filament are mechanically or thermally attached (e.g., certain sections can be "spot welded" together or the like over the length of the filament strand).

A notched, single-piece filament 636 may also or instead be used in the devices, systems, and methods discussed herein. The notched, single-piece filament 636 may include a notch 638 exposing or partially exposing an interior surface 640. The notch 638 may be relatively small compared to the profile of the filament, i.e., resembling a slit or the like, or the notch may take up a substantial portion of the perimeter of the filament, or anything in-between. The notch 638 may be shaped and sized to cooperate with a color applicator. For example, the notch 638 may be shaped and sized such that the color applicator can penetrate through the notch 638 to apply color to the interior surface 640, but otherwise the filament resembles a standard filament for ease in use/handling and for its compatibility with three-dimensional printers and components thereof. In other words, the notch 238 may only be as large as necessary for receiving a color applicator therein. The interior of the filament may be hollowed out (or substantially hollowed out) as shown in the figure, e.g., exposing a relatively large amount of the interior surface 640 therein for coloring. Alternatively, the interior of the filament may only be accessible for a width equal to that of the width of the notch 638, or it may include a smaller width than the notch 638. Other configurations are also or instead possible, such as including an interior having an interior shape or protrusion 642 disposed therein. The protrusion 642 may be shaped and sized to create a predetermined surface area for coloring, or shaped and sized to cooperate with a color applicator. The protrusion 642 may include an extension of the interior (as shown in the figure), or it may also or instead include carved out portions of the interior (e.g., interior notches or patterns). In an aspect, the notch 638 or the like may be mechanically, thermally, chemically, or otherwise sealed or partially sealed before extrusion. This sealing may be performed by the coupler as described herein, a crimping device, or another device. The coupler may simply press the notch 638 closed (or substantially closed) without sealing the notch 638 in an embodiment. In an aspect, the notch 638 instead remains in the filament when the filament is feed into an extruder of a three-dimensional printer.

It will be appreciated that a wide range of shapes may be used with an interior surface that can receive a dye or other colorants for color changing operations. Thus, an "interior surface" as that term is used herein may be any surface that is contained within a perimeter of the cross-sectional shape of the filament (e.g., inside a two-dimensional convex hull of the cross-sectional shape), or any surface that can be manipulated into the convex hull by mechanically deforming the cross-sectional shape prior to melting. While this is a useful working definition for interior surfaces, other definitions may also or instead be employed. For example, the interior surface may be any point or group of points inside a maximum distance from a center of mass of the two-dimensional cross-sectional shape. In another aspect, the interior surface may be any surface having a normal angle less than ninety degrees away from the center of mass. This definition does not include all interior surfaces that might be used for all cross-sections, but it usefully describes a range of interior surfaces for one-piece shapes such as approximately circular filaments with grooves approaching or passing through the center of mass, which might have color applied to them as contemplated herein. Where two or more pieces of filament are used, or where a single piece of filament is deformed, the interior surface may include any contact surface between portions of the filament except for exposed seams, i.e., seams on the exterior of the filament after it is closed or collapsed around the interior surfaces. More generally, these various working definitions of an "interior surface" are provided by way of non-limiting examples of an interior surface that can receive an application of a dye or other colorant in a manner such that contact of the colorant with interior surfaces of an extruder during melt and extrusion is reduced or minimized as contemplated herein.

Figure 21:
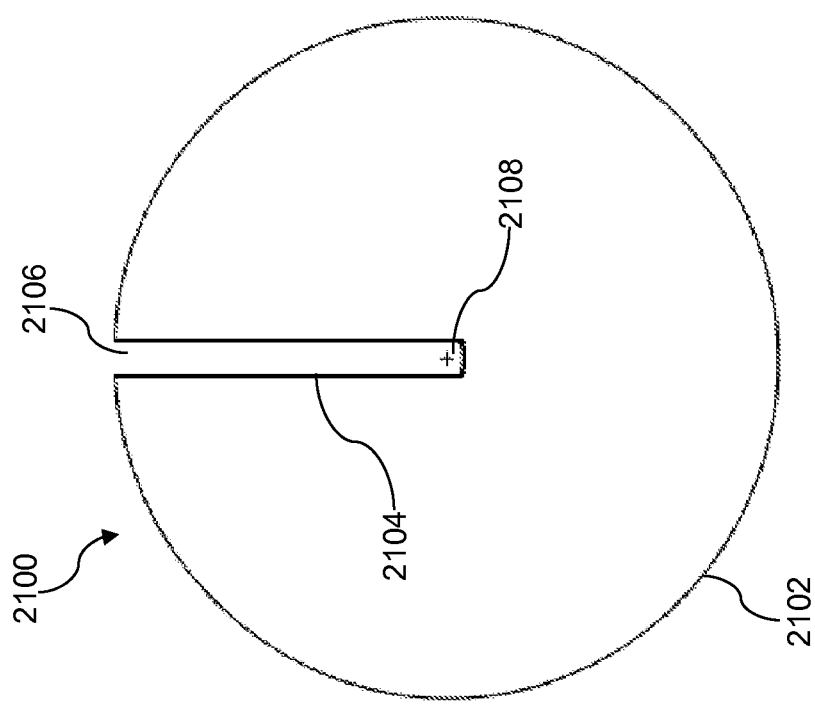
FIG. 21 illustrates a single piece filament.

FIG. 21 illustrates a single piece filament. The filament 2100 may include an exterior portion 2102, an interior portion 2104, and a slit 2106.

The exterior portion 2102 may be rounded or otherwise shaped and sized such that the filament 2100 resembles standard build material filaments of the prior art.

The interior portion 2104 may be the area or volume in which color is applied by the devices or systems as described herein.

The slit 2106 may include a void or groove that connects the exterior portion 2102 to the interior portion 2104, such that a color applicator can apply a color to the interior portion 2104. The color applicator may penetrate the slit 2106 or the color applicator can apply the color from outside of the slit 2106, e.g., by spraying, jetting, or the like. The slit 2106 may have a uniform or varying shape. For example, the slit 2106 may resemble a wedge shape, or an inverse wedge shape. In another aspect, the slit 2106 includes a pattern, e.g., a zig-zag, a wave, and so on. In yet another aspect, the filament 2100 includes a plurality of slits 2106. The plurality of slits 2106 may engage with a plurality of color applicators. In an aspect, the slit 2106 may be covered or partially covered by a membrane that can be pierced or punctured by the color applicator. The piercable membrane may be formed by a relatively thin wall of the filament 2100, e.g., a portion along the exterior portion 2102 of the filament 2100 adjacent to the slit 2106.

Although the filament 2100 may include many different sizes and shapes having different dimensions, one example is provided herein for illustration. In one aspect, the outer diameter of the filament is about 2.85 mm, with a slit 2106 having a depth that extends approximately halfway through the filament 2100, i.e., to its approximate center 2108. The slit 2106 may include a width of 0.5 mm, for example. The slit 2106 may instead have other widths, e.g., 1 mm, and/or other depths. In an aspect, the smaller the width of the slit 2106, the less recirculation of dye, which can result in bold colors and desirable transitions of color. However, the smaller the slit 2100, the more difficult it may be to apply the color therein.

Figure 22:
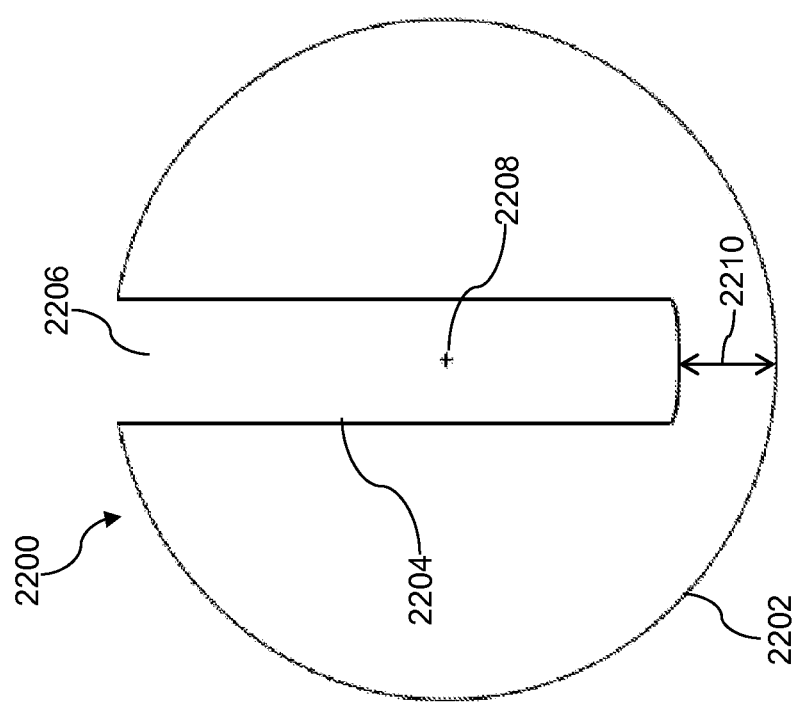
FIG. 22 illustrates another single piece filament.

FIG. 22 illustrates another single piece filament. The filament 2200 may include an exterior portion 2202, an interior portion 2204, and a slit 2206.

The slit 2206 may be wider and/or deeper than the implementation described above. For example, the slit 2206 in the figure is shown extending well beyond the approximate center 2208 of the filament 2200. In an aspect, the wall 2210 between the exterior portion 2202 and the end of the slit 2206 is approximately 0.5 mm.

The embodiments described above, or any other embodiments including a single piece filament, may have color applied to an interior portion thereof, and then be fed into an extruder "as is." Typically, this is made possible by the shape of the filament, which can substantially resemble a standard filament strand of the prior art. It is also or instead possible to couple, crimp, clamp, secure, or otherwise alter or deform the single piece filament after color is applied to an interior portion thereof but before being fed into an extruder of a three-dimensional printer. In an implementation, a coupler or the like presses portions of the single piece filament together such that the filament has a profile resembling that of a standard filament strand of the prior art. In this manner, the single piece filament may be deformable. The deformation may take place within the extruder of a three-dimensional printer or another device (either within or separate from the three-dimensional printer). In another implementation, the coupler or the like secures portions of the single piece filament together, e.g., through heating the filament or otherwise fixedly engaging portions of the filament together.

To achieve these profiles, a number of manufacturing processes can be implemented. The most common practice is the use of an extruder die that can be machined to the desired profile of the filament. The plastic can be extruded through the die to create the desired filament profile. In addition, a series of rollers and/or colanders can also be used with an extrusion system to shape the extruded plastic into the desired filament profile. These are two examples, not an extensive list, of the possible processes.

The filament portions 144, 188, 192, 504, 508 described herein may be constructed of any material that is compatible with 3D printers. In particular, the filaments and filament portions thereof may be constructed from poly lactic acid (PLA) and acrylonitrile-butadiene-styrene (ABS) thermoplastic, which is commonly used with 3D printers that are currently available. In other embodiments, the ABS filament is made out of oil based resources, has a much higher melting point than PLA plastic, and is stronger and harder. In other embodiments, the PLA filament is a biodegradable type of plastic that is manufactured out of plant-based resources, such as cornstarch or sugar cane. Other materials may include, but are not limited to polyvinyl acetate (PVA), nylon, thermoplastic elastomer (TPE), polycarbonate (PC), polyethylene terephthalate (PET), high impact polystyrene (HIPS), flexible material, stone filament, wood filament, or a conductive ABS filament. Additionally, bronze fill, wood fill, and conductive fill are within the scope of materials from which the materials may be constructed. In other embodiments, both types of thermoplastics or any other suitable polymer build material could be used to print multi-colored 3D objects depending on the needs of the user and the intentions of the final 3D object. Furthermore, material development is an ever-evolving aspect of 3D printing, and, therefore, the filament may be constructed from materials that are not yet known. Additionally, additives may be added to the filaments. Additives include, but are not limited to, color, conductive materials, magnetic materials, antimicrobial materials, metals, adhesives, and flavoring.

The color described herein may be solvent dyes, inks, pigments, and/or any other suitable chemical compositions or additives, such as aromatics, anti-microbial substances, flavorings, conductive materials, magnetic materials, glitters, fluorescent materials, and living cells. In preferred embodiments, the color-application unit 104 will use a solvent dye as the applied composition for adding color to the filament portions 144, 504, 508. The dyes may be composed of xylene, ethyl acetate, ethyl lactate, ethanol, butanol, and acetone, or any combination thereof. Alternatively, other organic dyes, pigments, and/or inks could be used to integrate color into the filament portions 144, 504, 508. These listed compositions are intended as examples of possible applied compositions and are not intended to be exclusive.

A composition the solvent of the color is determined by solubility parameters of solvents and materials used for the filaments and filament portions thereof. An effective solvent will have a solubility parameter of about 2 $(cal/cm^3)^{0.5}$ within the plastic material to be solubilized or penetrated. For example, PLA has a solubility parameter of 10.3 $(cal/cm^3)^{0.5}$ and xylene, ethyl lactate and ethyl acetate have solubility parameters of 8.8 $(cal/cm^3)^{0.5}$, 10.41 $(cal/cm^3)^{0.5}$, and 9.1 $(cal/cm^3)^{0.5}$, respectively.

Referring back to FIG. 1, each of the color-application and feed assemblies 100, 500 illustrated and described herein also includes a controller 700, a power supply module 704, a user interface 708, a communication module 712, and a motor module 716.

The controller or processor 700 is part of, or is connected to, an external device (e.g., a computer). The controller 700 (or computer) includes combinations of software and hardware that are operable to, among other functions, control the operation of color-application and feed assembly 100, 500, control the speed at which the filament portions 144, 188, 192, 504, 508 are pulled from the spools 148, 180, 184, 520, 524, and control the color that is applied to the filament portions 144, 504, 508. In one implementation, the controller 700 or external device includes a printed circuit board ("PCB") that is populated with a plurality of electrical and electronic components that provide, power, operational control, and protection to the power distribution devices. In some implementations, the PCB includes, for example, a processing unit (e.g., a microprocessor, a microcontroller, or another suitable programmable device), a memory, and a bus. The bus connects various components of the PCB including the memory to the processing unit. The memory includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit is connected to the memory and executes software that is capable of being stored in the RAM (e.g., during execution), the ROM (e.g., on a generally permanent basis), or another non-transitory computer readable medium such as another memory or a disc. Additionally or alternatively, the memory is included in the processing unit. The controller also includes an input/output ("I/O") unit that includes routines for transferring information between components within the controller and other components of the color-application assembly or the 3D printer. For example, the communication module is configured to provide communication between the color-application and feed assembly and one or more devices in the 3D printer.

Software included in some implementations of the power distribution device is stored in the memory of the controller 700. The software includes, for example, firmware, one or more applications, program data, one or more program modules, and other executable instructions. The controller 700 is configured to retrieve from memory and execute, among other components, instructions related to the control processes and methods described above. For example, the controller 700 is configured to execute instructions retrieved from the memory for determining which color to apply to the filament portions 144, 504, 508 based on data received in data packets from an external source or from the memory. In some implementations, the controller 700 or external device includes additional, fewer, or different components. In some embodiments, a computer program may be utilized to assist in the performance of the present technology. For example, using a computer program in conjunction with the 3D printer 10, the user imports a model of the desired 3D object into the program. The user then indicates the desired color or colors on the computer model. The computer program then slices the colored model layer by layer, creating directions for which color or colors to apply and when, and sends those directions to the color-application unit 104.

The PCB also includes, among other components, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 700.

The power supply module 704 supplies a nominal AC or DC voltage to the color-application and feed assembly 100, 500. The power supply module 704 is powered by main power having nominal line voltages between, for example, 100V and 240V AC and frequencies of approximately 50-60 Hz. The power supply module 704 is also configured to supply lower voltages to operate circuits and components within the color-application and feed assembly 100, 500. In some implementations, the power distribution device is powered by one or more batteries or battery packs.

The user interface 708 is included to control the color-application and feed assembly 100, 500 or the operation of the 3D printer 10 as a whole. The user interface is operably coupled to the controller to control, for example, the color applied to the filament portions 144, 504, 508. The user interface 708 can include any combination of digital and analog input devices required to achieve a desired level of control for the system. For example, the user interface 708 can include a computer having a display and input devices, a touch-screen display, a plurality of knobs, dials, switches, buttons, faders, or the like. In some implementations, the user interface is separated from the color-application and feed assembly 100, 500.

The communication module 712 sends and/or receives signals to and/or from one or more separate communication modules. Signals include, among other components, information, data, serial data, and data packets. The communication module 712 can be coupled to one or more separate communication modules via wires, fiber, and/or a wirelessly. Communication via wires and/or fiber can be any appropriate network topology known to those skilled in the art, such as Ethernet. Wireless communication can be any appropriate wireless network topology known to those skilled in the art, such as Wi-Fi.

The motor module 716 includes, among other components, one or more motor devices. The one or more motor devices 164, 268, 528 are configured to receive signals from the controller 700 and pull the filament portions 144, 188, 192, 504, 508 through the color-application assembly. In some implementations, the one or more motor devices are stepper motors.

The illustrated controller 700 is also coupled to the motor assemblies 176 of the color applicators 156. In some implementations, the controller 700 transmits signals to the motor assemblies 176, which cause the assemblies 176 to move the color applicators 156. For example, based on a desired color for a particular layer or portion of a 3D printed object, the controller 700 can actuate the motor assemblies 176 at suitable times to color the filament 290 so that portions of the filament 290 being used to form the particular layer or portion are the proper color. Since the controller 700, color-application unit 100, and 3D printer 10 function as a single system, the controller 700 knows how far the colored filament 290 will travel before the filament 290 will actually be used by the printer 10. The controller 700 accounts for this lag time to appropriately color the filament 290. Furthermore, the controller 700 can continuously actuate and de-actuate the motor assemblies 176 to apply different colors to different sections of the filament 290. For example, the controller 700 can actuate the assemblies 176 to color a first section (e.g., 10 cm length) of the filament 290 a first color (e.g., red), color a second section (e.g., a 20 cm length) of the filament 290 a second color (e.g., blue), and color a third section (e.g., a 15 cm length) of the filament 290 a third color (e.g., white). The amount and type of color applied to the filament 290 can be programmed into the controller 700 by a user, or can be automatically determined by the controller 700 based on desired colors identified in, for example, a CAD model.

Although the devices, systems, and methods discussed above are primarily described as being disposed upstream of a three-dimensional printer, implementations can include devices, systems, and methods where color is applied to an extrudate within a three-dimensional printer (e.g., a color-application unit is integral with the three-dimensional printer). To this end, a three-dimensional printer will now be discussed with reference to FIG. 25, where the three-dimensional printer can be adapted to be integrated with the devices, systems, and methods discussed above for coloring a filament of build material before extruding the filament to create a colored object during a three-dimensional printing process.

Figure 25:
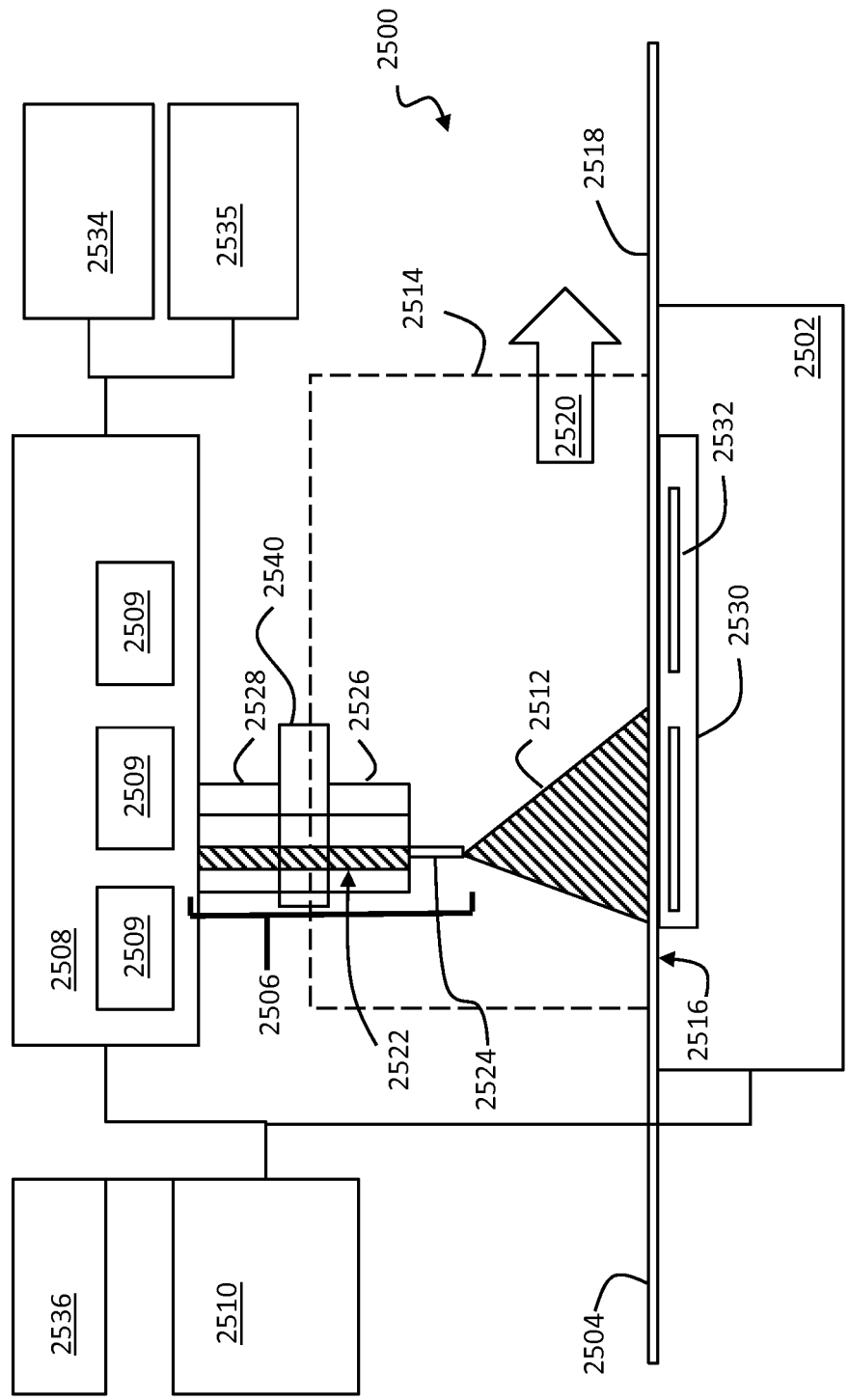
FIG. 25 is a block diagram of a three-dimensional printer.

FIG. 25 is a block diagram of a three-dimensional printer. In general, the printer 2500 may include a build platform 2502, a conveyor 2504, an extruder 2506, an x-y-z positioning assembly 2508, and a controller 2510 that cooperate to fabricate an object 2512 within a working volume 2514 of the printer 2500.

The build platform 2502 may include a surface 2516 that is rigid and substantially planar. The surface 2516 may support the conveyer 2504 in order to provide a fixed, dimensionally and positionally stable platform on which to build the object 2512.

The build platform 2502 may include a thermal element 2530 that controls the temperature of the build platform 2502 through one or more active devices 2532 such as resistive elements that convert electrical current into heat, Peltier effect devices that can create a heating or cooling affect, or any other thermoelectric heating and/or cooling devices. Thus the thermal element 2530 may be a heater that provides active heating to the build platform 2502, a cooling element that provides active cooling to the build platform 2502, or a combination of these. The heater 2530 may be coupled in a communicating relationship with the controller 2510 in order for the controller 2510 to controllably impart heat to or remove heat from the surface 2516 of the build platform 2502. Thus, the thermal element 2530 may include an active cooling element positioned within or adjacent to the build platform 2502 to controllably cool the build platform 2502.

It will be understood that a variety of other techniques may be employed to control a temperature of the build platform 2502. For example, the build platform 2502 may use a gas cooling or gas heating device such as a vacuum chamber or the like in an interior thereof, which may be quickly pressurized to heat the build platform 2502 or vacated to cool the build platform 2502 as desired. As another example, a stream of heated or cooled gas may be applied directly to the build platform 2502 before, during, and/or after a build process. Any device or combination of devices suitable for controlling a temperature of the build platform 2502 may be adapted to use as the thermal element 2530 described herein.

The conveyer 2504 may be formed of a sheet 2518 of material that moves in a path 2520 through the working volume 2514. Within the working volume 2514, the path 2520 may pass proximal to the surface 2516 of the build platform 2502—that is, resting directly on or otherwise supported by the surface 2516—in order to provide a rigid, positionally stable working surface for a build. It will be understood that while the path 2520 is depicted as a unidirectional arrow, the path 2520 may be bidirectional, such that the conveyer 2504 can move in either of two opposing directions through the working volume 2514. It will also be understood that the path 2520 may curve in any of a variety of ways, such as by looping underneath and around the build platform 2502, over and/or under rollers, or around delivery and take up spools for the sheet 2518 of material. Thus, while the path 2520 may be generally (but not necessarily) uniform through the working volume 2514, the conveyer 2504 may move in any direction suitable for moving completed items from the working volume 2514. The conveyor may include a motor or other similar drive mechanism (not shown) coupled to the controller 2510 to control movement of the sheet 2518 of material along the path 2520. Various drive mechanisms are described in further detail below.

In general, the sheet 2518 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 2518 may have a thickness of about three to about seven thousandths of an inch, or any other thickness that permits the sheet 2518 to follow the path 2520 of the conveyer 2504. For example, with sufficiently strong material, the sheet 2518 may have a thickness of about one to about three thousandths of an inch. The sheet 2518 may instead be formed of sections of rigid material joined by flexible links.

A working surface of the sheet 2518 (e.g., an area on the top surface of the sheet 2518 within the working volume 2514) may be treated in a variety of manners to assist with adhesion of build material to the surface 2518 and/or removal of completed objects from the surface 2518. For example, the working surface may be abraded or otherwise textured (e.g., with grooves, protrusions, and the like) to improve adhesion between the working surface and the build material.

A variety of chemical treatments may be used on the working surface of the sheet 2518 of material to further facilitate build processes as described herein. For example, the chemical treatment may include a deposition of material that can be chemically removed from the conveyer 2504 by use of water, solvents, or the like. This may facilitate separation of a completed object from the conveyer by dissolving the layer of chemical treatment between the object 2512 and the conveyor 2504. The chemical treatments may include deposition of a material that easily separates from the conveyer such as a wax, mild adhesive, or the like. The chemical treatment may include a detachable surface such as an adhesive that is sprayed on to the conveyer 2504 prior to fabrication of the object 2512.

In one aspect, the conveyer 2504 may be formed of a sheet of disposable, one-use material that is fed from a dispenser and consumed with each successive build.

In one aspect, the conveyer 2504 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 2504 may be used in a variety of different build processes by selecting the various working areas as needed or desired.

The extruder 2506 may include a chamber 2522 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can be usefully be extruded to form a three-dimensional object. The extruder 2506 may include an extrusion tip 2524 or other opening that includes an exit port with a circular, oval, slotted or other cross-sectional profile that extrudes build material in a desired cross-sectional shape.

The extruder 2506 may include a heater 2526 to melt thermoplastic or other meltable build materials within the chamber 2522 for extrusion through an extrusion tip 2524 in liquid form. While illustrated in block form, it will be understood that the heater 2526 may include, e.g., coils of resistive wire wrapped about the extruder 2506, one or more heating blocks with resistive elements to heat the extruder 2506 with applied current, an inductive heater, or any other arrangement of heaters suitable for creating heat within the chamber 2522 to melt the build material for extrusion. The extruder 2506 may also or instead include a drive assembly 2528 including a motor or the like to push the build material into the chamber 2522 and/or through the extrusion tip 2524. In another implementation, the drive assembly 2528 may be separate and independent from the extruder 2506, but still enables movement of the build material in the printer 2500, e.g., between components of the printer 2500 and/or for extrusion through the extruder 2506. In an aspect, the drive assembly 2528 moves a filament of build material from a coloring system 2540 to the extruder 2506 for depositing colored build material in the three-dimensional printing process.

In general operation (and by way of example rather than limitation), a build material such as ABS plastic in filament form may be fed into the chamber 2522 from a spool or the like by the drive assembly 2528, melted by the heater 2526, and extruded from the extrusion tip 2524. By controlling a rate of the drive assembly 2528 (e.g., a motor thereof), the temperature of the heater 2526, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 2508 may generally be adapted to three-dimensionally position the extruder 2506 and the extrusion tip 2524 within the working volume 2514. Thus by controlling the volumetric rate of delivery for the build material and the x, y, z position of the extrusion tip 2524, the object 2512 may be fabricated in three dimensions by depositing successive layers of material in two-dimensional patterns derived, for example, from cross-sections of a computer model or other computerized representation of the object 2512. A variety of arrangements and techniques are known in the art to achieve controlled linear movement along one or more axes. The x-y-z positioning assembly 2508 may, for example, include a number of stepper motors 2509 to independently control a position of the extruder within the working volume along each of an x-axis, a y-axis, and a z-axis. More generally, the x-y-z positioning assembly 2508 may include without limitation various combinations of stepper motors, encoded DC motors, gears, belts, pulleys, worm gears, threads, and the like. Any such arrangement suitable for controllably positioning the extruder 2506 within the working volume 2514 may be adapted to use with the printer 2500 described herein.

By way of example and not limitation, the conveyor 2504 may be affixed to a bed that provides x-y positioning within the plane of the conveyor 2504, while the extruder 2506 can be independently moved along a z-axis. As another example, the extruder 2506 may be stationary while the conveyor 2504 is x, y, and z positionable. As another example, the extruder 2506 may be x, y, and z positionable while the conveyer 2504 remains fixed (relative to the working volume 2514). In yet another example, the conveyor 2504 may, by movement of the sheet 2518 of material, control movement in one axis (e.g., the y-axis), while the extruder 2506 moves in the z-axis as well as one axis in the plane of the sheet 2518. Thus in one aspect, the conveyor 2504 may be attached to and move with at least one of an x-axis stage (that controls movement along the x-axis), a y-axis stage (that controls movement along a y-axis), and a z-axis stage (that controls movement along a z-axis) of the x-y-z positioning assembly 2508. More generally, any arrangement of motors and other hardware controllable by the controller 2510 may serve as the x-y-z positioning assembly 2508 in the printer 2500 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 2510 may be electrically coupled in a communicating relationship with the build platform 2502, the conveyer 2504, the x-y-z positioning assembly 2508, and the other various components of the printer 2500. In general, the controller 2510 is operable to control the components of the printer 2500, such as the build platform 2502, the conveyer 2504, the x-y-z positioning assembly 2508, and any other components of the printer 2500 described herein to fabricate the object 2512 from the build material. The controller 2510 may include any combination of software and/or processing circuitry suitable for controlling the various components of the printer 2500 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 2510 may include a microprocessor or other processing circuitry with sufficient computational power to provide related functions such as executing an operating system, providing a graphical user interface (e.g., to a display coupled to the controller 2510 or printer 2500), convert three-dimensional models into tool instructions, and operate a web server or otherwise host remote users and/or activity through the network interface 2536 described below.

A variety of additional sensors may be usefully incorporated into the printer 2500 described above. These are generically depicted as sensor 2534 in FIG. 25, for which the positioning and mechanical/electrical interconnections with other elements of the printer 2500 will depend upon the type and purpose of the sensor 2534 and will be readily understood and appreciated by one of ordinary skill in the art. The sensor 2534 may include a temperature sensor positioned to sense a temperature of the surface of the build platform 2502. This may, for example, include a thermistor or the like embedded within or attached below the surface of the build platform 2502. This may also or instead include an infrared detector or the like directed at the surface 2516 of the build platform 2502 or the sheet 2518 of material of the conveyer 2504. Other sensors that may be usefully incorporated into the printer 2500 as the sensor 2534 include a heat sensor, a volume flow rate sensor, a weight sensor, a sound sensor, and a light sensor. Certain more specific examples are provided below by way of example and not of limitation.

The sensor 2534 may include a sensor to detect a presence (or absence) of the object 2512 at a predetermined location on the conveyer 2504. This may include an optical detector arranged in a beam-breaking configuration to sense the presence of the object 2512 at a location such as an end of the conveyer 2504. This may also or instead include an imaging device and image processing circuitry to capture an image of the working volume 2514 and analyze the image to evaluate a position of the object 2512. This sensor 2534 may be used for example to ensure that the object 2512 is removed from the conveyer 2504 prior to beginning a new build at that location on the working surface such as the surface 2516 of the build platform 2502. Thus the sensor 2534 may be used to determine whether an object is present that should not be, or to detect when an object is absent. The feedback from this sensor 2534 may be used by the controller 2510 to issue processing interrupts or otherwise control operation of the printer 2500.

The sensor 2534 may include a sensor that detects a position of the conveyer 2504 along the path. This information may be obtained from an encoder in a motor that drives the conveyer 2504, or using any other suitable technique such as a visual sensor and corresponding fiducials (e.g., visible patterns, holes, or areas with opaque, specular, transparent, or otherwise detectable marking) on the sheet 2518.

The sensor 2534 may include a heater (instead of or in addition to the thermal element 2530) to heat the working volume 2514 such as a radiant heater or forced hot air to maintain the object 2512 at a fixed, elevated temperature throughout a build. The sensor 2534 may also or instead include a cooling element to maintain the object 2512 at a predetermined sub-ambient temperature throughout a build.

The sensor 2534 may also or instead include at least one video camera. The video camera may generally capture images of the working volume 2514, the object 2512, or any other hardware associated with the printer 2500. The video camera may provide a remote video feed through the network interface 2536, which feed may be available to remote users through a user interface maintained by, e.g., remote hardware, or within a web page provided by a web server hosted by the three-dimensional printer 2500. Thus, in one aspect there is a user interface adapted to present a video feed from at least one video camera of a three-dimensional printer to a remote user through a user interface.

The sensor 2534 may also or instead include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 2514. In another aspect, the sensor 2534 may include a machine vision system that captures images and analyzes image content to obtain information about the status of a job, working volume 2514, or an object 2512 therein. The machine vision system may support a variety of imaging-based automatic inspection, process control, and/or robotic guidance functions for the three-dimensional printer 2500 including without limitation pass/fail decisions, error detection (and corresponding audible or visual alerts), shape detection, position detection, orientation detection, collision avoidance, and the like.

Other components, generically depicted as other hardware 2535, may also be included, such as input devices including a keyboard, touchpad, mouse, switches, dials, buttons, motion sensors, and the like, as well as output devices such as a display, a speaker or other audio transducer, light emitting diodes, and the like. Other hardware 2535 may also or instead include a variety of cable connections and/or hardware adapters for connecting to, e.g., external computers, external hardware, external instrumentation or data acquisition systems, and the like.

The printer 2500 may include, or be connected in a communicating relationship with, a network interface 2536. The network interface 2536 may include any combination of hardware and software suitable for coupling the controller 2510 and other components of the printer 2500 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 2510 may be configured to control participation by the printer 2500 in any network to which the network interface 2536 is connected, such as by autonomously connecting to the network to retrieve printable content, or responding to a remote request for status or availability.

Devices, systems, and methods for enabling color control in three-dimensional printing processes by adding dye to a filament of build material may be integrated with the printer 2500 described above, such as with a coloring system 2540 that colors the interior of a filament upstream of the extruder 2506. The coloring system 2540 may include hardware such as the color-application unit and coupler described above.

The extruder 2506 may be configured to deposit a build material in a three-dimensional printing process. The extruder 2506 may be any as described herein or otherwise known in the art. For example, the extruder 2506 may be disposed in a printer head of the three-dimensional printer 2500. The coloring system 2540 (e.g., including the color application unit and coupler) may in general be disposed anywhere upstream from the extruder 2506, or more specifically upstream from the chamber 2522 where build material is liquefied for extrusion. The coloring system 2540 may include any of the color-application units and other hardware described herein, and the build material may correspondingly be a filament having any of the cross-sections described above. The coloring system 2540 may include a plurality of color applicators, where each is operable to selectively apply a different color to the interior surface of the filament. In another aspect, the color applicator includes an inkjet cartridge or other device or system positioned and configured to apply color by painting, inkjetting, or otherwise applying a colorant to desired surfaces.

As described above, the coloring system 2540 may include a body, a conduit extending through the body, and a motor that engages the filament to move it through the conduit. The color-application unit may also include a through-hole that extends through the body and is communication with the conduit. Additionally, the color applicator may include an elongate member containing the color and having a color applicator tip that is configured to apply the color to the interior surface of the filament through the through-hole. In an aspect, at least a portion of the elongate member is slidably received within the through-hole to selectively engage and apply the color to the interior surface of the filament.

The coupler may be configured to receive the filament from the color applicator and to substantially enclose the interior surface of the filament to which the color is applied. This may be accomplished through, e.g., crimping the filament, sealing the filament, connecting/joining multiple parts of a filament together, and so on. The coupler may use a heater or the like to fuse portions of the filament for substantially enclosing its interior surface. The coupler may also or instead mechanically join portions of the filament together to substantially enclose its interior surface. In an aspect, the coupler is connected to the extruder 2506 by a conduit, where the conduit includes a pathway for the filament to travel between the coupler and the extruder 2506. More generally, the coloring system 2540 may be adapted for use with the printer 2500, and in particular for integration into the feedpath of the printer 2500, e.g., at a location proximal to the extruder 2506 in order to reduce latency for color switches.

As generally described above, the filament may include a first filament portion and a second filament portion, where at least one of the first filament portion and the second filament portion include the interior surface that is colored by the color applicator. The coupler may be configured to join the first filament portion to the second filament portion to form the filament for extrusion in the three-dimensional printing process. The coupler may include a body that has a first channel and a second channel, where the first channel receives the first filament portion and the second channel receives the second filament portion. The first channel and the second channel may converge within the body to form a discharge channel that guides the filament through the body. The coupler may further include a motor and a roller assembly that is actuated by the motor. The roller assembly may engage the first filament portion and the second filament portion to advance the filament through the body.

It will be understood that the coupler may be omitted in an implementation. This includes an implementation with a single-piece filament or a multi-piece filament. In other words, the filament may be colored and then directed to the extruder for extrusion without being coupled in any manner.

In an aspect, the extruder 2506 and the coloring system 2540 are disposed within a build volume of the three-dimensional printer 2500, or attached to a positioning system capable of positioning the extruder 2506 and coloring system 2540 so that a tip of the extruder 2506 can deposit material at a desired location within the build volume under control of the controller.

In an implementation, the color-application unit and the coupler of the coloring system 2540 may be integrated together as a single hardware unit mechanically fixed to the extruder 2506. In another implementation, the extruder 2506 and the coupler may be integrated together as a single unit. In yet another implementation, the color-application unit and the extruder 2506 may be integrated together, e.g., in a print head or the like of the printer 2500. Still more generally, the coloring system 2540 may be integrated into the printer 2500 in a variety of manners, e.g., coupled to the extruder 2506 or a frame of the printer 2500, or at some other position along the feedpath of a filament or similar build material.

Figure 26:
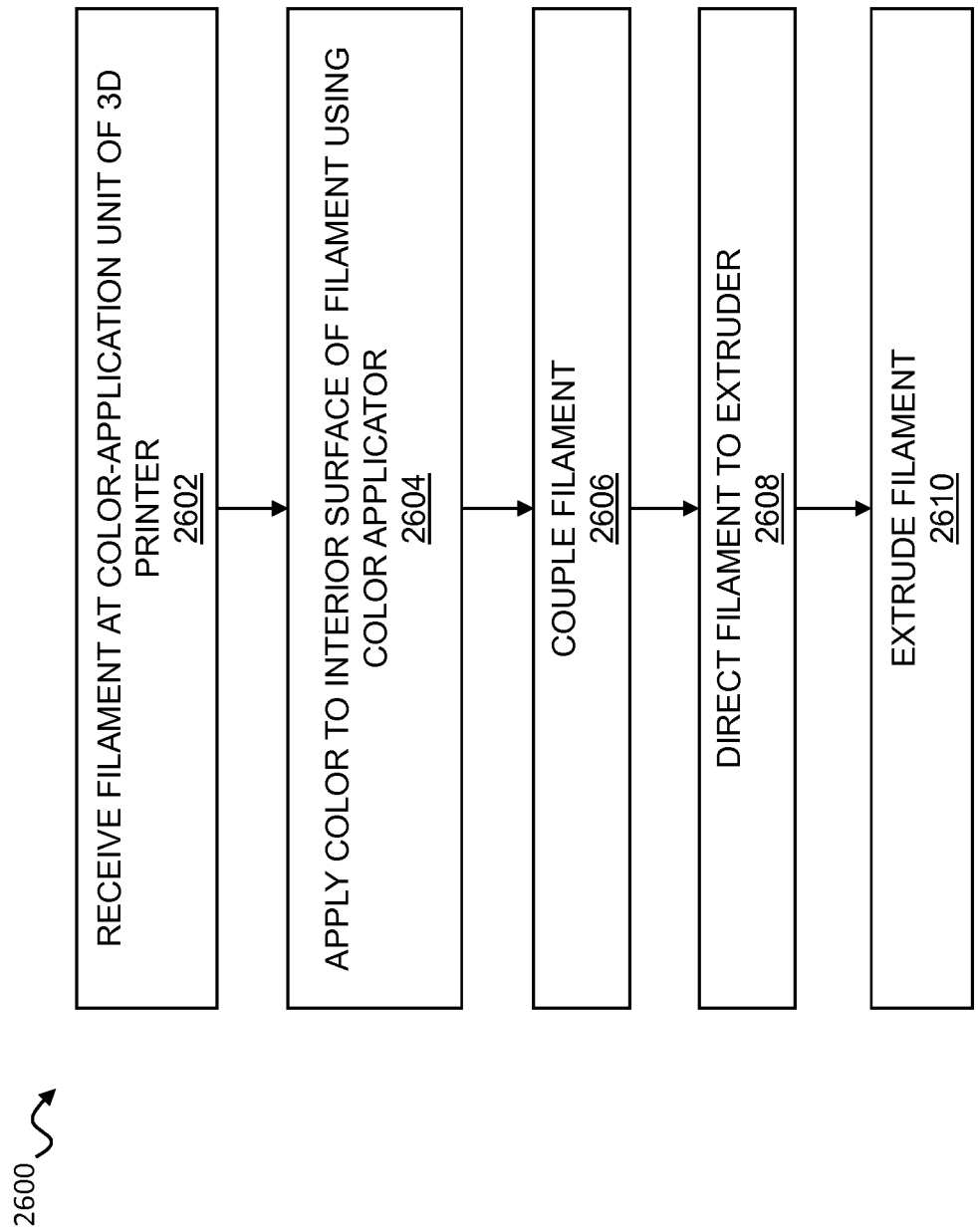
FIG. 26 is a flowchart of a method for three-dimensional fabrication of an object using a three-dimensional printer.

FIG. 26 is a flowchart of a method for three-dimensional fabrication of an object using a three-dimensional printer.

As shown in step 2602, the method 2600 may include receiving a filament at a color-application unit of the three-dimensional printer. The color-application unit may be positioned upstream of an extruder within the three-dimensional printer, or more specifically upstream of a chamber of the extruder where the filament is liquefied for extrusion.

As shown in step 2604, the method 2600 may include applying color to an interior surface of the filament using a color applicator coupled to the color-application unit. This may, for example, be any of the color applicators described above, as well as combinations of color applicators for a broader spectrum of controllable colors.

As shown in step 2606, the method 2600 may include coupling the filament. For example, the filament may include a first filament portion and a second filament portion, where at least one of the first filament portion and the second filament portion include the interior surface to be colored by the color applicator. Thus, coupling the filament may include coupling the first filament portion to the second filament portion to form the filament for extrusion. In an aspect, a coupler that is positioned downstream of the color applicator and upstream of the extruder couples the first filament portion and the second filament portion. In another aspect, the extruder couples the first filament portion and the second filament portion.

In an embodiment including a coupler, coupling the filament may include receiving the first filament portion in a first channel disposed in a body of the coupler, receiving the second filament portion in a second channel disposed in the body of the coupler, and joining the first filament portion and the second filament portion within a discharge channel formed by a convergence of the first channel and the second channel within the body of the coupler.

As shown in step 2608, the method 2600 may include directing the filament from the color-application unit to the extruder.

As shown in step 2610, the method 2600 may include extruding the filament to fabricate the object in a three-dimensional printing process, as generally contemplated above.

The coloring system as described herein may be included in a device configured for placement in a three-dimensional printer, i.e., upstream from an extruder. For example, in an aspect, the device includes a color-application unit configured to receive a filament of build material, where the color application unit is configured for placement upstream of an extruder, e.g., it is a modular component or the like. A color applicator may be coupled to the color-application unit and operable to selectively apply a color to an interior surface of the filament before the filament is passed to the extruder.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A three-dimensional printer comprising:
   an extruder configured to deposit a build material in a three-dimensional printing process;
   a coloring system including a color-application unit disposed upstream from the extruder, the color-application unit configured to receive a filament of the build material, the color-application unit including:
   a body;
   a conduit extending through the body;
   a motor that engages the filament to move the filament through the conduit; and
   a through-hole that extends through the body and is communication with the conduit; and
   a color applicator operable to selectively apply a color to an interior surface of the filament, the color applicator including an elongate member containing the color and having a color applicator tip that is configured to apply the color to the interior surface of the filament through the through-hole, wherein at least a portion of the elongate member is slidably received within the through-hole to selectively engage and apply the color to the interior surface of the filament; and
   a drive assembly for moving the filament from the coloring system to the extruder for depositing colored build material in the three-dimensional printing process.

2. The three-dimensional printer of claim 1 further comprising a coupler configured to receive the filament from the color applicator and to substantially enclose the interior surface of the filament that received the color before passing the filament to the extruder.

3. The three-dimensional printer of claim 2 wherein the coupler is connected to the extruder by a conduit, the conduit including a pathway for the filament to travel between the coupler and the extruder.

4. The three-dimensional printer of claim 2 wherein the color-application unit and the coupler are integrated together as a single unit.

5. The three-dimensional printer of claim 2 wherein the extruder and the coupler are integrated together as a single unit.

6. The three-dimensional printer of claim 2 wherein the filament includes a first filament portion and a second filament portion, at least one of the first filament portion and the second filament portion including the interior surface, and wherein the coupler is configured to join the first filament portion to the second filament portion to form the filament for extrusion in the three-dimensional printing process.

7. The three-dimensional printer of claim 6 wherein the coupler includes a body that has a first channel and a second channel, wherein the first channel receives the first filament portion and the second channel receives the second filament portion, and wherein the first channel and the second channel converge within the body to form a discharge channel that guides the filament through the body.

8. The three-dimensional printer of claim 7 wherein the coupler includes a motor and a roller assembly that is actuated by the motor, and wherein the roller assembly engages the first filament portion and the second filament portion to advance the filament through the body.

9. The three-dimensional printer of claim 1 wherein the extruder and the color-application unit are disposed within a build volume of the three-dimensional printer.

10. The three-dimensional printer of claim 1 wherein the color-application unit includes a plurality of color applicators, each operable to selectively apply a different color to the interior surface of the filament.

11. The three-dimensional printer of claim 1 wherein the color applicator includes one or more of an inkjet cartridge, a thermal inkjet, a pressure inkjet, a piezo pump, a pressure pump, a spray mechanism, a microfluidic device, and a rubber applicator.

12. The three-dimensional printer of claim 1 wherein the extruder is disposed in a printer head of the three-dimensional printer.

13. A method for three-dimensional fabrication of an object using a three-dimensional printer comprising:
    receiving a filament at a color-application unit of the three-dimensional printer, the color-application unit positioned upstream of an extruder within the three-dimensional printer, the color-application unit including a body, a conduit extending through the body, a motor that engages the filament to move the filament through the conduit, and a through-hole that extends through the body and is communication with the conduit;
    applying color to an interior surface of the filament using a color applicator coupled to the color-application unit, the color applicator including an elongate member containing the color and having a color applicator tip that is configured to apply the color to the interior surface of the filament through the through-hole of the color-application unit, wherein at least a portion of the elongate member is slidably received within the through-hole to selectively engage and apply the color to the interior surface of the filament;
    directing the filament from the color-application unit to the extruder; and
    extruding the filament to fabricate the object in a three-dimensional printing process.

14. The method of claim 13 wherein the filament includes a first filament portion and a second filament portion, at least one of the first filament portion and the second filament portion including the interior surface.

15. The method of claim 14 further comprising coupling the first filament portion to the second filament portion to form the filament for extrusion.

16. The method of claim 15 wherein a coupler that is positioned downstream of the color applicator and upstream of the extruder couples the first filament portion and the second filament portion.

17. The method of claim 16 further comprising:
    receiving the first filament portion in a first channel disposed in a body of the coupler;
    receiving the second filament portion in a second channel disposed in the body of the coupler; and
    joining the first filament portion and the second filament portion within a discharge channel formed by a convergence of the first channel and the second channel within the body of the coupler.

18. The method of claim 13, wherein the color applicator includes one or more of an inkjet cartridge, a thermal inkjet, a pressure inkjet, a piezo pump, a pressure pump, a spray mechanism, a microfluidic device, and a rubber applicator.

19. A device comprising:
- a color-application unit configured for placement upstream from an extruder configured to deposit a build material in a three-dimensional printing process, wherein the color-application unit is configured to receive a filament of the build material, the color-application unit including a body a conduit extending through the body, a motor that engages the filament to move the filament through the conduit, and a through-hole that extends through the body and is communication with the conduit; and
- a color applicator coupled to the color-application unit and operable to selectively apply a color to an interior surface of the filament before the filament is passed to the extruder, the color applicator including an elongate member containing the color and having a color applicator tip that is configured to apply the color to the interior surface of the filament through the through-hole, wherein at least a portion of the elongate member is slidably received within the through-hole to selectively engage and apply the color to the interior surface of the filament.

20. The device of claim 19, wherein the color applicator includes one or more of an inkjet cartridge, a thermal inkjet, a pressure inkjet, a piezo pump, a pressure pump, a spray mechanism, a microfluidic device, and a rubber applicator.

* * * * *